United States Patent
Yatabe

(10) Patent No.: US 10,657,914 B2
(45) Date of Patent: May 19, 2020

(54) DRIVING METHOD FOR LIQUID CRYSTAL APPARATUS, LIQUID CRYSTAL APPARATUS, AND ELECTRONIC APPARATUS

(71) Applicant: SEIKO EPSON CORPORATION, Tokyo (JP)

(72) Inventor: Satoshi Yatabe, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/167,970

(22) Filed: Oct. 23, 2018

(65) Prior Publication Data
US 2019/0122622 A1  Apr. 25, 2019

(30) Foreign Application Priority Data
Oct. 24, 2017  (JP) .................. 2017-204978

(51) Int. Cl.
| G09G 3/20 | (2006.01) |
| G09G 3/36 | (2006.01) |
| G02F 1/1337 | (2006.01) |
| G02F 1/1343 | (2006.01) |

(52) U.S. Cl.
CPC ......... *G09G 3/3611* (2013.01); *G02F 1/1337* (2013.01); *G02F 1/134336* (2013.01); *G09G 3/3614* (2013.01)

(58) Field of Classification Search
None
See application file for complete search history.

(56) References Cited

U.S. PATENT DOCUMENTS

| 9,412,319 | B2 | 8/2016 | Tomikawa | |
|---|---|---|---|---|
| 9,858,875 | B2 | 1/2018 | Tomikawa | |
| 2007/0085484 | A1* | 4/2007 | Hsu | G09G 3/3648 |
| | | | | 315/169.2 |
| 2008/0111767 | A1* | 5/2008 | Liu | G09G 3/3611 |
| | | | | 345/58 |
| 2014/0184661 | A1* | 7/2014 | Tsuda | G09G 3/3696 |
| | | | | 345/690 |
| 2014/0368481 | A1 | 12/2014 | Tomikawa | |
| 2015/0153620 | A1* | 6/2015 | Iwata | G02F 1/134309 |
| | | | | 349/123 |
| 2016/0314753 | A1 | 10/2016 | Tomikawa | |

FOREIGN PATENT DOCUMENTS

| JP | 2008-292861 A | 12/2008 |
| JP | 2013-83790 A | 5/2013 |
| JP | 2015-1634 A | 1/2015 |

* cited by examiner

*Primary Examiner* — Carl Adams
(74) *Attorney, Agent, or Firm* — Oliff PLC

(57) ABSTRACT

A driving method for a liquid crystal apparatus of the invention wherein at least a counter electrode of a plurality of pixel electrodes and the counter electrode is covered with an insulating film, the method including applying an alternating current voltage to a plurality of pixels, the alternating current voltage being set in a manner that first regions in which a center potential $VC_1$ is offset to a high potential side and second regions in which a center potential $VC_2$ is offset to a low potential side, with reference to a counter electrode potential Vcom applied to the counter electrode, are alternately arranged in a plane of a display region in which the plurality of pixels are arranged.

19 Claims, 14 Drawing Sheets

DRIVING METHOD FOR LIQUID CRYSTAL APPARATUS, LIQUID CRYSTAL APPARATUS, AND ELECTRONIC APPARATUS

BACKGROUND

1. Technical Field

The invention relates to a driving method for a liquid crystal apparatus, a liquid crystal apparatus, and an electronic apparatus.

2. Related Art

A liquid crystal apparatus is provided with a liquid crystal panel including a liquid crystal layer sandwiched by a pair of substrates. When light is incident to the liquid crystal panel, various ionic impurities may be generated, for example, by a photochemical reaction between a liquid crystal material or an alignment film that constitutes the liquid crystal panel and the incident light. In addition, the ionic impurities may mix into the liquid crystal layer from materials or devices used in the manufacturing processes of the liquid crystal panel.

It has been known that the ionic impurities in the liquid crystal layer diffuse into a display region or partially aggregate due to the drive or heat of the liquid crystal apparatus, and the ionic impurities are recognized, for example, as stains or unevenness on display and lead to deterioration of display properties. In particular, in the liquid crystal apparatus used for an optical modulation means (light valve) of a projection-type display apparatus (projector), the luminous flux density of the incident light is high compared with a direct-view-type liquid crystal apparatus, and thus a photochemical reaction easily occurs, it becomes necessary to suppress the ionic impurities from influencing the display.

To improve a malfunction associated with the aforementioned ionic impurities, for example, in JP-A-2015-1634, a driving method for a liquid crystal apparatus is disclosed, wherein three electrodes are arranged at predetermined intervals between a display region and a seal member, and alternating current signals having an identical frequency are applied to these electrodes respectively while phases are sequentially shifted.

According to the driving method for the liquid crystal apparatus of JP-A-2015-1634 described above, the direction of an electric field formed between these electrodes by the application of the alternating current signals shifts from a first electrode that is close to the display region to a second electrode with a lapse of time, and then shifts from the second electrode to a third electrode, so that the ionic impurities in the liquid crystal layer can be effectively swept away from the display region to an outside along with the movement of the direction of the electric field.

In the driving method for the liquid crystal apparatus of JP-A-2015-1634 described above, first, the ionic impurities present on an outer edge side of the display region are attracted to the first electrode. Thus, it is conceivable that a density difference of the ionic impurities is generated between a center side of the display region and the outer edge side of the display region, and that the ionic impurities are swept away to the outer edge of the display region so as to eliminate the density difference. However, this electric field effect becomes weaker as it goes farther from the first electrode, and in a method using the density difference of the ionic impurities, it is difficult to efficiently sweep away the ionic impurities present on the central side of the display region to the outside, and the ionic impurities may be left in the display region. Thus, when the ionic impurities left in the display region are unevenly distributed (aggregated) partially, the deterioration of the display properties may occur.

SUMMARY

The invention is made to settle at least part of the aforementioned drawbacks and can be achieved in the following aspects or application examples.

Application Example 1

In accordance with a driving method for a liquid crystal apparatus according to the application example, the liquid crystal apparatus includes a plurality of pixel electrodes and a counter electrode that are opposite to each other via a liquid crystal layer, wherein at least the counter electrode of the plurality of pixel electrodes and the counter electrode are covered with an insulating film, the method including applying an alternating current voltage to the plurality of pixel electrodes, the alternating current voltage being set in a manner that a first region in which a center potential is offset to a high potential side and a second region in which a center potential is offset to a low potential side, with reference to a counter electrode potential applied to the counter electrode, are alternately arranged in a plane of a display region in which the plurality of pixel electrodes are arranged.

According to the driving method of the application example, the center potential of the alternating current voltage applied to the plurality of pixel electrodes is offset with respect to the counter electrode potential, and thus a direct current component (DC component) in accordance with an offset amount is generated. At least the counter electrode of the plurality of pixel electrodes and the counter electrode is covered with the insulating film, and thus when an alternating current voltage is applied between the pixel electrodes and the counter electrode, the electric charge of the DC component is charged to the insulating film. In accordance with the charged electric charge, a surface potential that is higher than the counter electrode potential is generated at the insulating film in the first region in which the center potential is offset to a high potential side, and a surface potential that is lower than the counter electrode potential is generated at the insulating film in the second region in which the center potential is offset to a low potential side. Thus, when ionic impurities exist in the liquid crystal layer, the ionic impurities having negative polarity move to the first region, and the ionic impurities having positive polarity move to the second region. The first region and the second region are alternately arranged in the plane of the display region, and thus the ionic impurities present in the liquid crystal layer are dispersed without partially aggregating in the plane of the display region. That is, the driving method of the liquid crystal apparatus that is capable of suppressing the deterioration of display characteristics due to the maldistribution of the ionic impurities in the liquid crystal layer can be provided.

Note that even when the center potential of the alternating current voltage applied to the plurality of pixel electrodes is offset to the counter electrode potential, the DC component is charged to the insulating film, and an effective driving voltage corresponding to the alternating current voltage is applied to the liquid crystal layer, and thus the DC component is unlikely to affect the display. In addition, when the drive of the liquid crystal apparatus is stopped, the DC component charged to the insulating film is discharged through a drive circuit, and thus a display malfunction, for example, burn-in and the like does not occur.

Application Example 2

In accordance with the driving method for the liquid crystal apparatus described in the application example, an alternating current voltage set in a manner that the first region and the second region are arranged in a checkered pattern may be applied to the plurality of pixel electrodes.

According to the method of the application example, the ionic impurities are dispersed in a checkered pattern in the plane of the display region, and thus partial maldistribution can be suppressed.

Application Example 3

In accordance with the driving method for the liquid crystal apparatus described in the application example, an alternating current voltage set in a manner that the first region and the second region are arranged in a stripe pattern may be applied to the plurality of pixel electrodes.

According to the method of the application example, the ionic impurities are dispersed in a stripe pattern in the plane of the display region, and thus partial maldistribution can be suppressed.

Application Example 4

In accordance with the driving method for the liquid crystal apparatus described in the application example, an alternating current voltage set in a manner that an extending direction of the stripe pattern intersects with an alignment direction of the liquid crystal layer may be applied to the plurality of pixel electrodes.

According to the method of the application example, the alternating current voltage set in a manner that the extending direction of the stripe pattern intersects with the alignment direction of the liquid crystal layer, is applied to the plurality of pixel electrodes. The flow of the liquid crystal molecules is generated along the alignment direction when the liquid crystal layer is driven, and thus when the ionic impurities are included in the liquid crystal layer, the ionic impurities may move to a corner section of the display region along the flow of the liquid crystal molecules, that is, along the alignment direction and may be unevenly distributed. When the extending direction of the stripe pattern in which the first region and the second region are arranged is a direction intersecting with the alignment direction of the liquid crystal layer, the movement of the ionic impurities toward the corner section of the display region along the alignment direction is suppressed by an electric barrier between the first region and the second region. Consequently, the partial maldistribution of the ionic impurities can be effectively suppressed.

Application Example 5

In accordance with the driving method for the liquid crystal apparatus described in the application example, an alternating current voltage set in a manner that the first region and the second region include a plurality of pixels may be applied to the plurality of pixel electrodes.

According to the method of the application example, the ionic impurities are dispersed for each of the plurality of pixels, and thus the partial maldistribution can be suppressed.

Application Example 6

In accordance with the driving method for the liquid crystal apparatus described in the application example, an alternating current voltage set in a manner that the first region and the second region include one pixel may be applied to the plurality of pixel electrodes.

According to the method of the application example, the ionic impurities are dispersed for each pixel, and thus the partial maldistribution can be suppressed.

Application Example 7

In accordance with the driving method for the liquid crystal apparatus described in the application example, an alternating current voltage set in a manner that a third region in which a center potential is offset to an identical potential side with respect to the counter electrode potential is arranged at a diagonal position in the plane of the display region may be applied to the plurality of pixel electrodes.

According to the method of the application example, the third region in which the center potential is offset to the identical potential side with respect to the counter electrode potential is arranged at the diagonal position. When the ionic impurities are included in the liquid crystal layer, the ionic impurities may move to a corner section of the display region along the alignment direction in which the flow of the liquid crystal molecules is generated and may be unevenly distributed at the diagonal positions. In a case that the polarity of the ionic impurities present in the liquid crystal layer can be specified, when the third region in which the center potential is offset to the potential side whose polarity is identical to the polarity of the ionic impurities (for example, in a case that the ionic impurities having positive polarity are aggregated, the center potential is offset to the high potential side) is arranged, the ionic impurities repel and do not move to the third region, and thus the maldistribution of the ionic impurities at the diagonal position can be suppressed.

Application Example 8

In accordance with the driving method for the liquid crystal apparatus described in the application example, an alternating current voltage of which an offset amount of the center potential with respect to the counter electrode potential gradually changes from zero to a predetermined value until a predetermined time lapses from a start of display may be applied to the plurality of pixel electrodes.

According to the method of the application example, the surface potential of the insulating film gradually changes by the electric charge of the DC component in accordance with the offset amount, and thus occurrence of a display malfunction, for example, flicker due to a sudden change in the surface potential of the insulating film and the like can be suppressed.

Application Example 9

The liquid crystal apparatus according to the application example may include a plurality of pixel electrodes and a counter electrode configured to be opposite to each other via a liquid crystal layer, an insulating film configured to cover at least the counter electrode of the plurality of pixel electrodes and the counter electrode, and an alternating current voltage generation circuit configured to output an alternating current voltage to the plurality of pixel electrodes, in which the alternating current voltage is set in a manner that a first region in which a center potential is offset to a high potential side and a second region in which a center potential is offset to a low potential side, with reference to a counter electrode potential applied to the counter electrode, are alternately arranged in a plane of a display region in which the plurality of pixel electrodes are arranged.

According to the configuration of the application example, the center potential of the alternating current voltage output to the plurality of pixel electrodes by the alternating current voltage generation circuit is offset with respect to the counter electrode potential, and thus a direct current component (DC component) in accordance with an offset amount is generated. At least the counter electrode of the plurality of pixel electrodes and the counter electrode is covered with the insulating film, and thus when the alternating current voltage is applied between the pixel electrodes and the counter electrode, the electric charge of the DC component is charged to the insulating film. In accordance with the charged electric charge, a surface potential that is higher than the counter electrode potential is generated at the insulating film in the first region, and a surface potential that is lower than the counter electrode potential is generated at the insulating film in the second region. Thus, when the ionic impurities exist in the liquid crystal layer, the ionic impurities having negative polarity move to the first region, and the ionic impurities having positive polarity move to the second region. The first region and the second region are alternately arranged in the plane of the display region, and thus the ionic impurities present in the liquid crystal layer are dispersed without partially aggregating in the plane of the display region. That is, the liquid crystal apparatus that is capable of suppressing the deterioration of display characteristics due to the maldistribution of the ionic impurities in the liquid crystal layer can be provided.

Application Example 10

In accordance with the liquid crystal apparatus described in the application example, the alternating current voltage generation circuit may output an alternating current voltage set in a manner that the first region and the second region are arranged in a checkered pattern to the plurality of pixel electrodes.

According to the configuration of the application example, the ionic impurities are dispersed in a checkered pattern in the plane of the display region, and thus the partial maldistribution can be suppressed.

Application Example 11

In accordance with the liquid crystal apparatus described in the application example, the alternating current voltage generation circuit may output an alternating current voltage set in a manner that the first region and the second region are arranged in a stripe pattern to the plurality of pixel electrodes.

According to the configuration of the application example, the ionic impurities are dispersed in a stripe pattern in the plane of the display region, and thus the partial maldistribution can be suppressed.

Application Example 12

In accordance with the liquid crystal apparatus described in the application example, the alternating current voltage generation circuit may output an alternating current voltage set in a manner that an extending direction of the stripe pattern intersects with an alignment direction of the liquid crystal layer to the plurality of pixel electrodes.

According to the configuration of the application example, the alternating current voltage set in a manner that the extending direction of the stripe pattern intersects with the alignment direction of the liquid crystal layer is output to the plurality of pixel electrodes. Typically, the ionic impurities in the liquid crystal layer tend to move along the alignment direction of the liquid crystal layer. When the extending direction of the stripe pattern in which the first region and the second region are arranged is a direction intersecting with the alignment direction of the liquid crystal layer, the movement of the ionic impurities along the alignment direction is suppressed by an electric barrier between the first region and the second region. Consequently, the partial maldistribution of the ionic impurities can be effectively suppressed.

Application Example 13

In accordance with the liquid crystal apparatus described in the application example, the alternating current voltage generation circuit may output an alternating current voltage set in a manner that the first region and the second region include a plurality of pixels to the plurality of pixel electrodes.

According to the configuration of the application example, the ionic impurities are dispersed for each of the plurality of pixels, and thus the partial maldistribution can be suppressed.

Application Example 14

In accordance with the liquid crystal apparatus described in the application example, the alternating current voltage generation circuit may output an alternating current voltage set in a manner that the first region and the second region include one pixel to the plurality of pixel electrodes.

According to the configuration of the application example, the ionic impurities are dispersed for each pixel, and thus the partial maldistribution can be suppressed.

Application Example 15

In accordance with the liquid crystal apparatus described in the application example, the alternating current voltage generation circuit may output an alternating current voltage set in a manner that a plurality of pixels in which an offset amount of the center potential with respect to the counter electrode potential is equal are arranged at a diagonal position in the plane of the display region, to the plurality of pixel electrodes.

According to the configuration of the application example, a third region in which the center potential is offset to the identical potential side with respect to the counter electrode potential is arranged at the diagonal position. When the ionic impurities are included in the liquid crystal layer, the ionic impurities may move to a corner section of the display region along the alignment direction in which the flow of the liquid crystal molecules is generated and may be unevenly distributed at the diagonal position. In a case that the polarity of the ionic impurities present in the liquid crystal layer can be specified, when the third region in which the center potential is offset to the potential side whose polarity is identical to the polarity of the ionic impurities (for example, in a case that the ionic impurities having positive polarity are aggregated, the center potential is offset to the high potential side) is arranged, the ionic impurities repel and do not move to the third region, and thus the maldistribution of the ionic impurities at the diagonal position can be suppressed.

Application Example 16

In accordance with the liquid crystal apparatus described in the application example, the alternating current voltage generation circuit may output an alternating current voltage of which an offset amount of the center potential with respect to the counter electrode potential gradually changes from zero to a predetermined value until a predetermined time lapses from a start of display, to the plurality of pixel electrodes.

According to the configuration of the application example, the surface potential of the insulating film gradually changes by the electric charge of the DC component in accordance with the offset amount, and thus occurrence of a display malfunction, for example, flicker due to a sudden change in the surface potential of the insulating film and the like can be suppressed.

Application Example 17

An electronic apparatus according to the application example includes the liquid crystal apparatus described in the application example.

According to the configuration of the application example, the liquid crystal apparatus in which a display malfunction attributed to the ionic impurities is unlikely to occur is included, and thus the electronic apparatus that achieves high reliability and quality in display can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments to which the invention is applied will be described with reference to accompanying drawings. Note that the drawings used are illustrated by appropriately enlarging or reducing an explanatory portion, so that the explanatory portion is recognizable.

In the exemplary embodiments, an active matrix-type liquid crystal apparatus provided with a thin film transistor (TFT) as a pixel switching element is described as an example. This liquid crystal apparatus can be used as, for example, an optical modulation element (liquid crystal light valve) of a projector to be described below.

First Exemplary Embodiment

Liquid Crystal Apparatus

Figure 1:
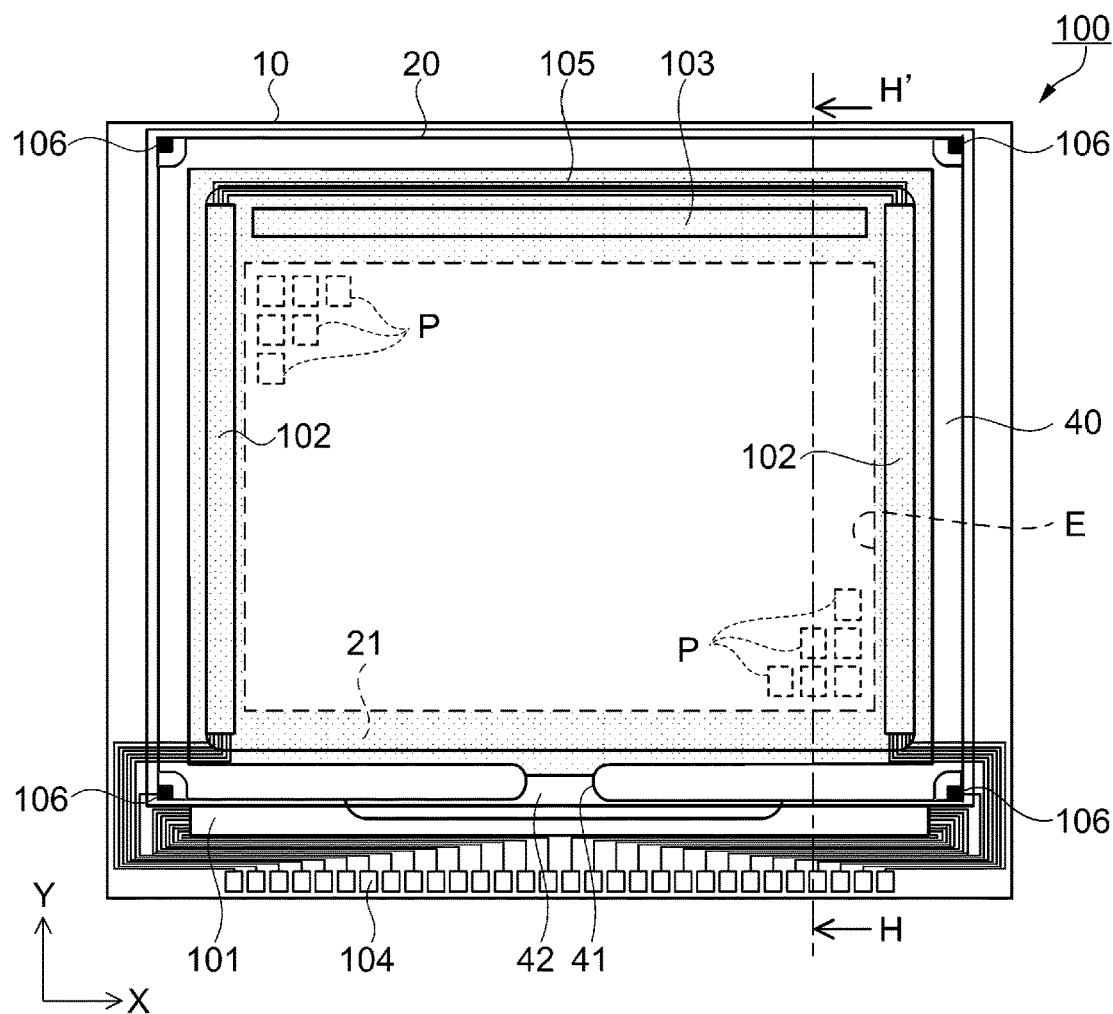
FIG. 1 is a schematic plan view illustrating the configuration of a liquid crystal apparatus according to a first exemplary embodiment.
Figure 2:
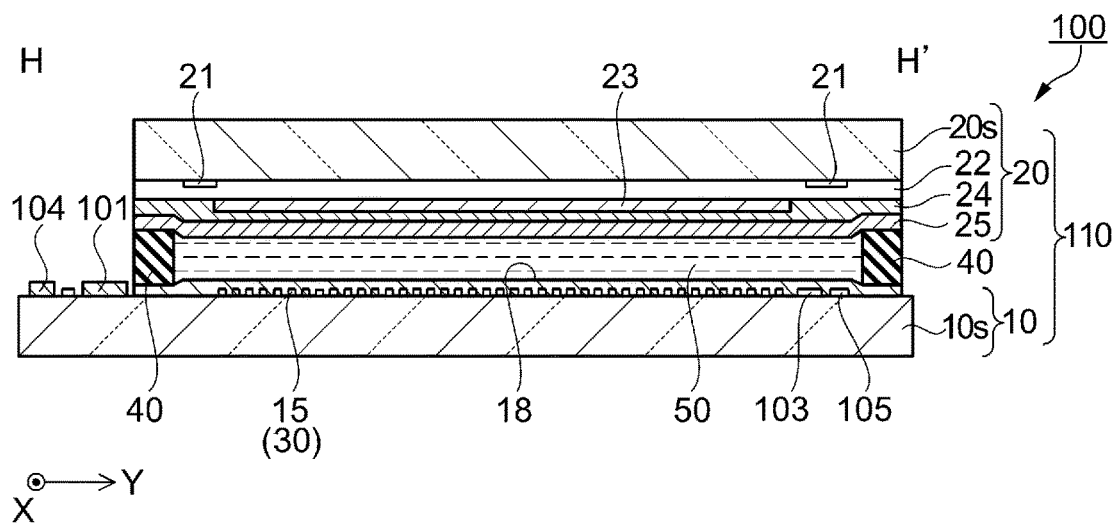
FIG. 2 is a schematic cross-sectional view of a liquid crystal panel taken along an H-H' line illustrated in FIG. 1.
Figure 3:
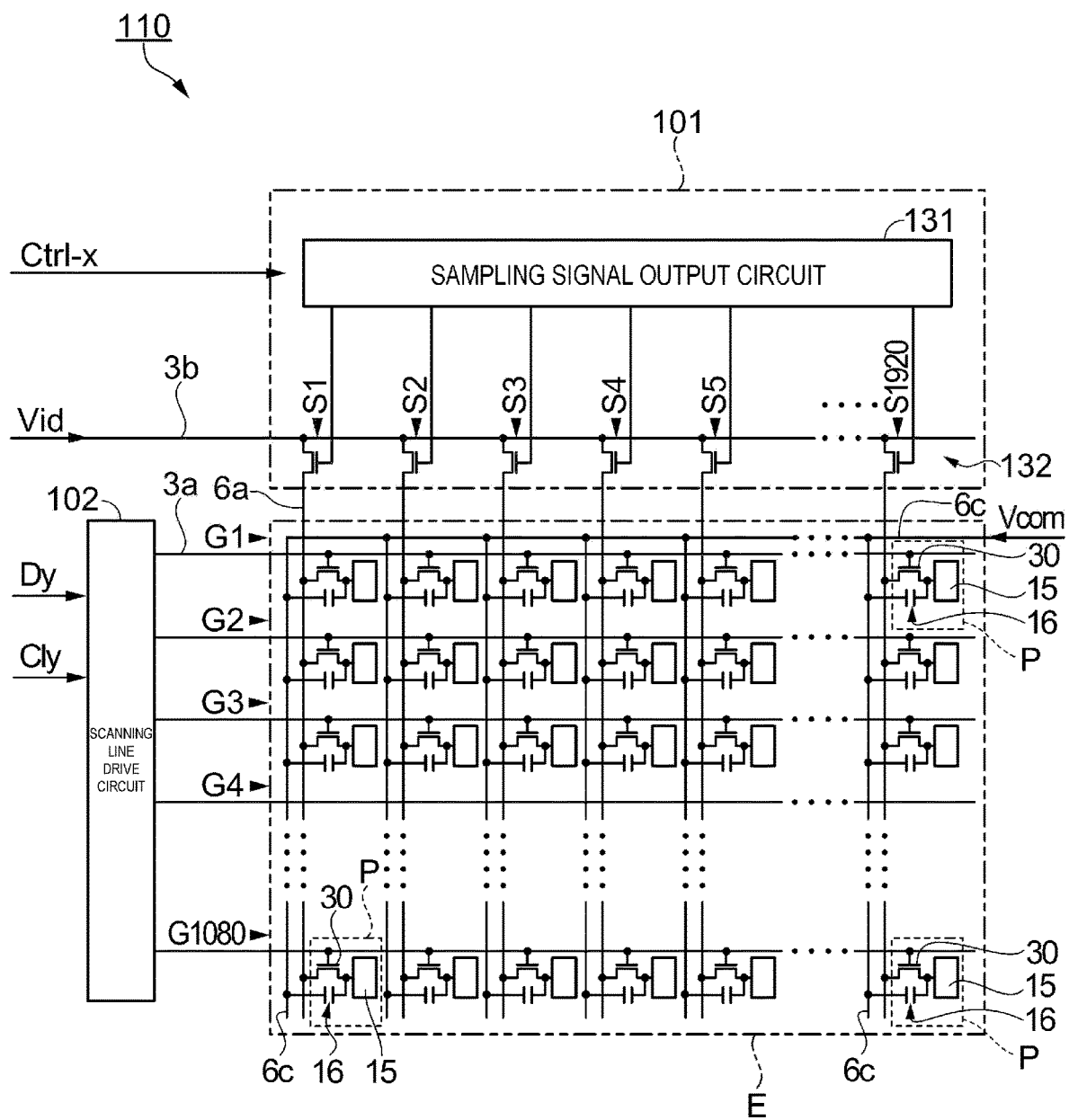
FIG. 3 is an equivalent circuit diagram illustrating the electrical configuration of the liquid crystal panel of the liquid crystal apparatus according to the first exemplary embodiment.

First, the liquid crystal apparatus of the exemplary embodiment will be described with reference to FIGS. 1 to 3. FIG. 1 is a schematic plan view illustrating the configuration of the liquid crystal apparatus according to a first exemplary embodiment. FIG. 2 is a schematic cross-sectional view of a liquid crystal panel taken along an H-H' line illustrated in FIG. 1. FIG. 3 is an equivalent circuit diagram illustrating the electrical configuration of the liquid crystal panel of the liquid crystal apparatus according to the first exemplary embodiment.

As illustrated in FIGS. 1 and 2, a liquid crystal apparatus 100 of the exemplary embodiment includes an element substrate 10, a counter substrate 20 that are arranged opposite to each other, and a liquid crystal layer 50 sandwiched by the aforementioned substrates. For example, a quartz substrate or a glass substrate which are transparent can be used for a base material 10s of the element substrate 10 and a base material 20s of the counter substrate 20.

The element substrate 10 is larger than the counter substrate 20, and both substrates are bonded at an interval via a sealing unit 40 arranged along an outer edge of the counter substrate 20. A discontinued portion of the sealing unit 40 serves as an injection port 41, and liquid crystal having positive or negative dielectric antisotropy is injected from the injection port 41 into the interval by a vacuum injection method, and the injection port 41 is sealed with a sealant 42. Note that the method of filling the liquid crystal into the interval is not limited to the vacuum injection method, but for example, one drop fill (ODF) method in which the liquid crystal drips inside of the sealing unit 40 arranged in a frame shape, and the element substrate 10 and the counter substrate 20 are bonded under reduced pressure may be applied.

As for the sealing unit 40, for example, an adhesive agent such as a thermosetting or ultraviolet curable epoxy resin is used. A spacer (not illustrated) for maintaining the interval between the pair of substrates to be constant is incorporated into the sealing unit 40.

A pixel region E including a plurality of pixels P aligned in a matrix is provided inside of the sealing unit 40. In addition, a parting portion 21 that surrounds the pixel region E is provided between the sealing unit 40 and the pixel region E. The parting portion 21 is composed of, for example, a light-shielding metal or a metal oxidant. Note that dummy pixels DP to be described in detail later are arranged in the pixel region E, in addition to effective pixels P which contributes to the display.

A terminal unit in which a plurality of external connection terminals 104 are aligned is provided in the element substrate 10. A data line drive circuit 101 is provided between a first side portion along the terminal unit and the sealing unit 40. In addition, an inspection circuit 103 is provided between the sealing unit 40 along a second side portion opposite to the first side portion and the pixel region E. Further, scanning line drive circuits 102 are provided between the sealing unit 40 along third and fourth side portions that are orthogonal to the first side portion and opposite to each other and the pixel region E. A plurality of wirings 105 connecting the two scanning line drive circuits 102 are provided between the sealing unit 40 of the second side portion and the inspection circuit 103.

The wirings connecting the data line drive circuit 101 and the scanning line drive circuits 102 are connected to the plurality of external connection terminals 104 aligned along the first side portion. Note that the arrangement of the inspection circuit 103 is not limited to this, but may be provided at a position along the inside of the sealing unit 40 between the data line drive circuit 101 and the pixel region E.

Hereinafter, in the description, a direction along the first side portion is an X direction, and a direction along the third side portion is a Y direction. In addition, viewing along a direction from the counter substrate 20 side to the element substrate 10 side is referred to as "plan view" or "planarly".

As illustrated in FIG. 2, light reflective pixel electrodes 15 and thin film transistors (hereinafter referred to as TFT) 30 as switching elements, which are provided for each pixel P, signal wirings, and an alignment film 18 covering the aforementioned elements are formed on the surface on the liquid crystal layer 50 side of the element substrate 10. The element substrate 10 includes the base material 10s, the pixel electrodes 15 formed on the base material 10s, the TFTs 30, the signal wiring, and the alignment film 18.

The counter substrate 20 arranged opposite to the element substrate 10 includes the base material 20s, the parting portion 21 formed on the base material 20s, a planarization layer 22 forming a film to cover the above, a counter electrode 23 that covers the planarization layer 22 and functions as a common electrode provided at least across the pixel region E, an insulating film 24 covering the counter electrode 23, and an alignment film 25 covering the insulating film 24.

The parting portion 21 surrounds the pixel region E as illustrated in FIG. 1 and is provided at a position that planarly overlaps with the scanning line drive circuits 102 and the inspection circuit 103. Thus, light incident to these circuits from the counter substrate 20 side is shielded such that these circuits are prevented from erroneously operating due to the light. Further, unnecessary stray light is shielded so as not to be incident to the pixel region E, which secures high contrast on the display in the pixel region E.

The planarization layer 22 is composed of, for example, an inorganic material such as silicon oxide, is light transmissive, and is provided to cover the parting portion 21. The method for forming this planarization layer 22 includes, for example, a method for forming a film by using a plasma CVD method and the like.

The counter electrode 23 is composed of, for example, a transparent conductive film such as indium tin oxide (ITO), covers the planarization layer 22, and is electrically connected with vertical conductive sections 106 provided on four corners of the counter substrate 20 as illustrated in FIG. 1. The vertical conductive sections 106 are electrically connected with the wirings on the element substrate 10 side. The vertical conductive sections 106 are feeding points at which the counter electrode potential is supplied to the counter electrode 23.

The insulating film 24 is composed of, for example, an inorganic material such as silicon oxide, is light transmissive, and is provided to cover the counter electrode 23. The method for forming this insulating film 24 includes, as with the planarization layer 22, for example, a method for forming a film by using the plasma CVD method and the like. The thickness of the insulating film 24 is, for example, approximately 200 nm.

The alignment film 18 on the pixel electrode 15 side and the alignment film 25 on the counter electrode 23 side are selected based on the optical design of the liquid crystal apparatus 100. The alignment films 18 and 25, for example, include an organic alignment film on which a substantially horizontal orientation processing is applied to liquid crystal molecules having positive dielectric antisotropy by forming a film of an organic material such as polyimide and rubbing the surface of the film, and an inorganic alignment film in which a film of an inorganic material such as silicon oxide (SiOx) is formed by using a vapor deposition, and liquid crystal molecules having negative dielectric antisotropy are substantially vertically aligned.

This liquid crystal apparatus 100 is a reflective type and employs the optical design of "normally-white mode" in which the light reflectance of the pixels P is maximum in a state where no voltage is applied, or the optical design of "normally-black mode" in which the light reflectance of the pixels P is minimum in a state where no voltage is applied. Polarization elements are used by being respectively arranged according to the optical design on the light incident side and light emission side of a liquid crystal panel 110 that includes the element substrate 10 and the counter substrate 20.

In the exemplary embodiment, hereinafter, description will be given of an example in which the inorganic alignment film described above as the alignment films 18 and 25 and liquid crystal having negative dielectric antisotropy are used, and the optical design of normally-black mode is applied.

Next, the electrical configuration of the liquid crystal panel 110 will be described with reference to FIG. 3. As illustrated in FIG. 3, for example, (1920×1080) pieces of pixels P are arrayed in the pixel region E. In the exemplary embodiment, a case in which 1920 pieces of pixels P are arrayed in the X direction (the longitudinal direction of the pixel region E), and 1080 pieces of pixels P are arrayed in the Y direction (the lateral direction of the pixel region E) is described, but the number of pixels P or arraying mode is not limited to this, and can be modified as appropriate.

In the pixel region E, a plurality of scanning lines 3a extending in the X direction and a plurality of data lines 6a intersecting with the plurality of scanning lines 3a and extending in the Y direction are provided. In addition, a plurality of capacitance lines 6c extending in the Y direction so as to be in parallel with the data lines 6a is provided. The plurality of capacitance lines 6c are consolidated into one, to which a fixed potential is provided. In the exemplary embodiment, the fixed potential identical to the counter electrode potential (Vcom) provided for the counter electrode 23 is provided for the plurality of capacitance lines 6c.

The pixel P is provided corresponding to an intersection portion between the scanning line 3a and the data line 6a. Each pixel P includes the thin film transistor (TFT) 30 that is a switching element connected to the scanning line 3a and the data line 6a, the pixel electrode 15 connected to the TFT 30, and a storage capacitor 16 provided between the capacitance line 6c and the pixel electrode 15. The pixel electrode 15, the storage capacitor 16, and the TFT 30 are formed on the element substrate 10.

The scanning lines 3a and the data lines 6a are respectively drawn to the outside of the pixel region E. The scanning lines 3a are connected to the scanning line drive circuit 102, and the data lines 6a are connected to the data line drive circuit 101.

A trigger signal Dy and a clock signal Cly are input to the scanning line drive circuit 102. The trigger signal Dy is a signal defining a start timing of each frame of display data corresponding to each scanning line 3a. The clock signal Cly is a signal defining a timing of supplying a scanning signal to each scanning line 3a in a period of each frame. The scanning line drive circuit 102 supplies scanning signals G1 to G1080 to the plurality of scanning lines 3a based on the trigger signal Dy and the clock signal Cly and line-sequentially causes the scanning line 3a to be a selected state. When the scanning line 3a is caused to be a selected state, the TFT 30 connected to this scanning line 3a is turned on.

The data line drive circuit 101 includes a sampling signal output circuit 131 and data input switches 132 provided corresponding to respective data lines 6a. A data input wire 3b to which a data signal Vid is supplied is connected to a source of the data input switch 132. The data line drive circuit 101 synchronizes the selection operation of the scanning line 3a by the scanning line drive circuit 102 and supplies the data signal Vid to the data line 6a.

Specifically, a control signal Ctrl-x is input to the sampling signal output circuit 131. The sampling signal output circuit 131 sequentially causes the data input switches 132 to be an on state in accordance with the control signal Ctrl-x. At this time, the data signal Vid is supplied to the data input wiring 3b as series data including gradation data for each pixel connected to one scanning line 3a, and the data signal Vid is input to the data line 6a via the data input switch 132 in an on state. The data signal Vid is written into the pixel electrode 15 via the TFT 30 of the pixel P connected to the scanning line 3a in the selected state.

For example, when the gradation data is written into a pixel P in the i-th row and the j-th column, the data signal Vid (gradation data) is supplied from the data line drive circuit 101 to the data line in the j-th column at timing when the scanning line 3a in the i-th row is caused to be a selected state. Thus, the gradation data is written into the pixel electrode 15 via the on-state TFT 30 of the pixel P in the i-th row and the j-th column.

The data signal Vid (gradation data) written into the pixel electrode 15 is stored by liquid crystal capacitor including the liquid crystal layer 50 between the pixel electrode 15 and the counter electrode 23 and is stored by the storage capacitor 16 between the capacitance line 6c and the pixel electrode 15. Thus, display in the pixel region E is carried out based on the data signal Vid.

Note that (1920×1080) pieces of pixels P contributed to the display are illustrated in FIG. 3, but actually, dummy pixels DP including the configuration identical to the electrical configuration of the pixels P are arranged in the pixel region E. The arrangement of the dummy pixels DP will be described in detail later.

Figure 4:
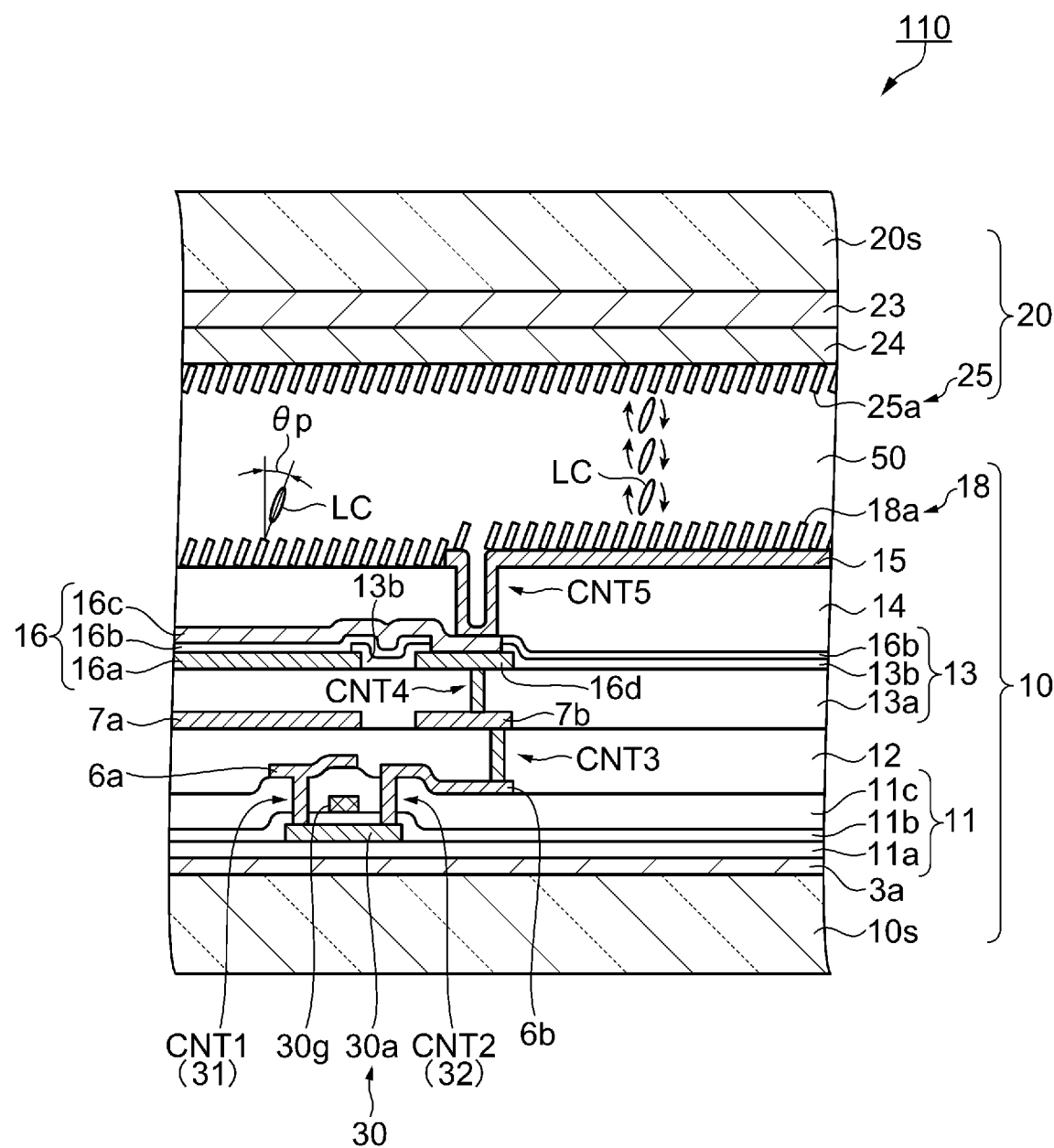
FIG. 4 is a schematic cross-sectional view illustrating the structure of a pixel of the liquid crystal panel of the liquid crystal apparatus according to the first exemplary embodiment.

Next, the structure of the pixel P in the liquid crystal panel 110 will be described with reference to FIG. 4. FIG. 4 is a schematic cross-sectional view illustrating the structure of the pixel of the liquid crystal panel of the liquid crystal apparatus according to the first exemplary embodiment.

As illustrated in FIG. 4, first, the scanning line 3a is formed on the base material 10s of the element substrate 10. The scanning line 3a can use a metal simple substance including at least one of metals, for example, titanium (Ti), chromium (Cr), tungsten (W), tantalum (Ta), molybdenum (Mo) and the like, alloy, metal silicide, polysilicide, nitride, or the lamination of the aforementioned chemical substances, and has light shielding property.

A first insulating film (base insulating film) 11a composed of, for example, silicon oxide and the like is formed to cover the scanning lines 3a, and a semiconductor layer 30a is formed in an insular shape on the first insulating film 11a. The semiconductor layer 30a, for example, is composed of a polycrystalline silicon film, wherein impurity ions are injected, and a lightly-doped drain (LDD) structure including a first source-drain region, a junction region, a channel region, a junction region, and a second source-drain region is formed.

A second insulating film (gate insulating film) 11b is formed to cover the semiconductor layer 30a. Further, a gate electrode 30g is formed at a position opposite to the channel region with the second insulating film 11b sandwiched.

A third insulating film 11c is formed to cover the gate electrode 30g and the second insulating film 11b, and two contact holes CNT1 and CNT2 that penetrate the second insulating film 11b and the third insulating film 11c are formed at positions that overlap with respective end portions of the semiconductor layer 30a.

Then, a conductive film is formed by using light shielding conductive materials such as aluminum (Al) or an alloy of aluminum to fill the two contact holes CNT1 and CNT2 and cover the third insulating film 11c, and the conductive film is patterned, so that a source electrode 31 and the data line 6a connected to the first source-drain region via the contact hole CNT1 are formed. A drain electrode 32 (a first relay electrode 6b) coupled to the second source-drain region via the contact hole CNT2 is simultaneously formed.

Subsequently, a first interlayer insulating film 12 is formed to cover the data line 6a, the first relay electrode 6b, and the third insulating film 11c. The first interlayer insulating film 12 is composed of, for example, silicon oxide, nitride, and the like. Then, planarization processing is carried out to planarize unevenness on the surface caused by covering an region in which the TFT 30 is provided. As a method for the planarization processing, for example, chemical mechanical polishing (CMP) processing, spin coating processing, and the like are included.

A contact hole CNT3 that penetrates the first interlayer insulating film 12 is formed at a position that overlaps with the first relay electrode 6b. A conductive film composed of light shielding metals, for example, aluminum (Al), an alloy of aluminum, and the like is formed to coat the contact holes CNT3 and cover the first interlayer insulating film 12, and the conductive film is patterned, so that a wiring 7a and a second relay electrode 7b electrically connected to the first relay electrode 6b via the contact hole CNT3 are formed. The wiring 7a is formed in such a manner as to planarly overlap with the semiconductor layer 30a of the TFT 30 or the data line 6a, and is applied with a fixed potential to function as a shield layer.

A second interlayer insulating film 13a is formed to cover the wiring 7a and the second relay electrode 7b. The second interlayer insulating film 13a can also be formed by using, for example, silicon oxide, nitride, or oxynitride.

A contact hole CNT4 is formed at a position that overlaps with the second relay electrode 7b of the second interlayer insulating film 13a. A conductive film composed of light shielding metals, for example, titanium nitride (TiN) and the like is formed to coat the contact hole CNT4 and cover the second interlayer insulating film 13a, and the conductive film is patterned, so that a first capacitance electrode 16a and a third relay electrode 16d are formed.

An insulating film 13b is formed by patterning in such a manner as to cover an outer edge of a portion of the first capacitance electrode 16a, wherein the portion is opposite to a second capacitance electrode 16c via a dielectric layer 16b formed later. In addition, the insulating film 13b is formed by patterning in such a manner as to cover an outer edge of the third relay electrode 16d except for a portion of the third relay electrode 16d which overlaps with a contact hole CNT5.

The dielectric layer 16b is formed to cover the insulating film 13b and the first capacitance electrode 16a. As the dielectric layer 16b, single layer films such as a silicon nitride film, hafnium oxide ($HfO_2$), alumina ($Al_2O_3$), tantalum oxide ($Ta_2O_5$) or multilayer films in which at least two types of the aforementioned single layer films are laminated may be used. A portion of the dielectric layer 16b which planarly overlaps with the third relay electrode 16d is removed by etching and the like.

A conductive film, for example, titanium nitride (TiN) and the like is formed to cover the dielectric layer 16b, and the conductive film is patterned, so that a second capacitance electrode 16c that is arranged opposite to the first capacitance electrode 16a and connected to the third relay electrode 16d is formed. The storage capacitor 16 includes the dielectric layer 16b, and the first capacitance electrode 16a and the second capacitance electrode 16c which are arranged opposite to each other with the dielectric layer 16b sandwiched.

Subsequently, a third interlayer insulating film 14 covering the second capacitance electrode 16c and the dielectric layer 16b is formed. The third interlayer insulating film 14 is composed of, for example, silicon oxide, nitride, and the like, and the planarization processing such as CMP processing is carried out with respect to the third interlayer insulating film 14. The contact hole CNT5 that penetrates the third interlayer insulating film 14 is formed in such a manner as to reach a portion of the second capacitance electrode 16c which is in contact with the third relay electrode 16d.

An electrode film composed of, for example, Al, an alloy including Al, and the like is formed to coat the contact hole CNT5 and cover the third interlayer insulating film 14. The electrode film is patterned, and thus the pixel electrode 15 electrically connected to the second capacitance electrode 16c and the third relay electrode 16d via the contact hole CNT5 is formed.

The second capacitance electrode 16c is electrically connected to the drain electrode 32 of the TFT 30 via the third relay electrode 16d, the contact hole CNT4, the second relay electrode 7b, the contact hole CNT3, and the first relay electrode 6b and is electrically connected to the pixel electrode 15 via the contact hole CNT5.

The first capacitance electrode 16a is formed across the plurality of pixels P and functions as the capacitance line 6c in the equivalent circuit (see FIG. 3). The aforementioned fixed potential is applied to the first capacitance electrode 16a. Consequently, the potential (the data signal Vid) applied to the pixel electrode 15 via the drain electrode 32 of the TFT 30 can be retained between the first capacitance electrode 16a and the second capacitance electrode 16c.

Thus, the plurality of wirings are formed on the base material 10s of the element substrate 10, but the wiring structure of the element substrate 10 is not limited to this.

The alignment film 18 is formed to cover the pixel electrode 15, and the insulating film 24 and the alignment film 25 are formed to cover the counter electrode 23 of the counter substrate 20 arranged opposite to the element substrate 10 via the liquid crystal layer 50. As described above, the alignment films 18 and 25 are the organic alignment films and made up of an aggregate of columnar bodies 18a and 25a in which an inorganic material such as silicon oxide is, for example, obliquely deposited from a predetermined direction and accumulated in a columnar shape.

The liquid crystal molecules LC having negative dielectric antisotropy with respect to the alignment films 18 and 25 include a pre-tilt angle θp of 3 to 5 degrees in an inclination direction of the columnar bodies 18a and 25a with respect to the normal direction of an alignment film surface and are vertically aligned (VA: Vertical Alignment). An alternating current voltage (driving voltage) is applied between the pixel electrode 15 and the counter electrode 23 to drive the liquid crystal layer 50, so that the liquid crystal molecules LC behave (vibrate) in such a manner as to be inclined in an electric field direction generated between the pixel electrode 15 and the counter electrode 23. In other words, the liquid crystal molecules LC vibrate in the pre-tilt direction.

Figure 5:
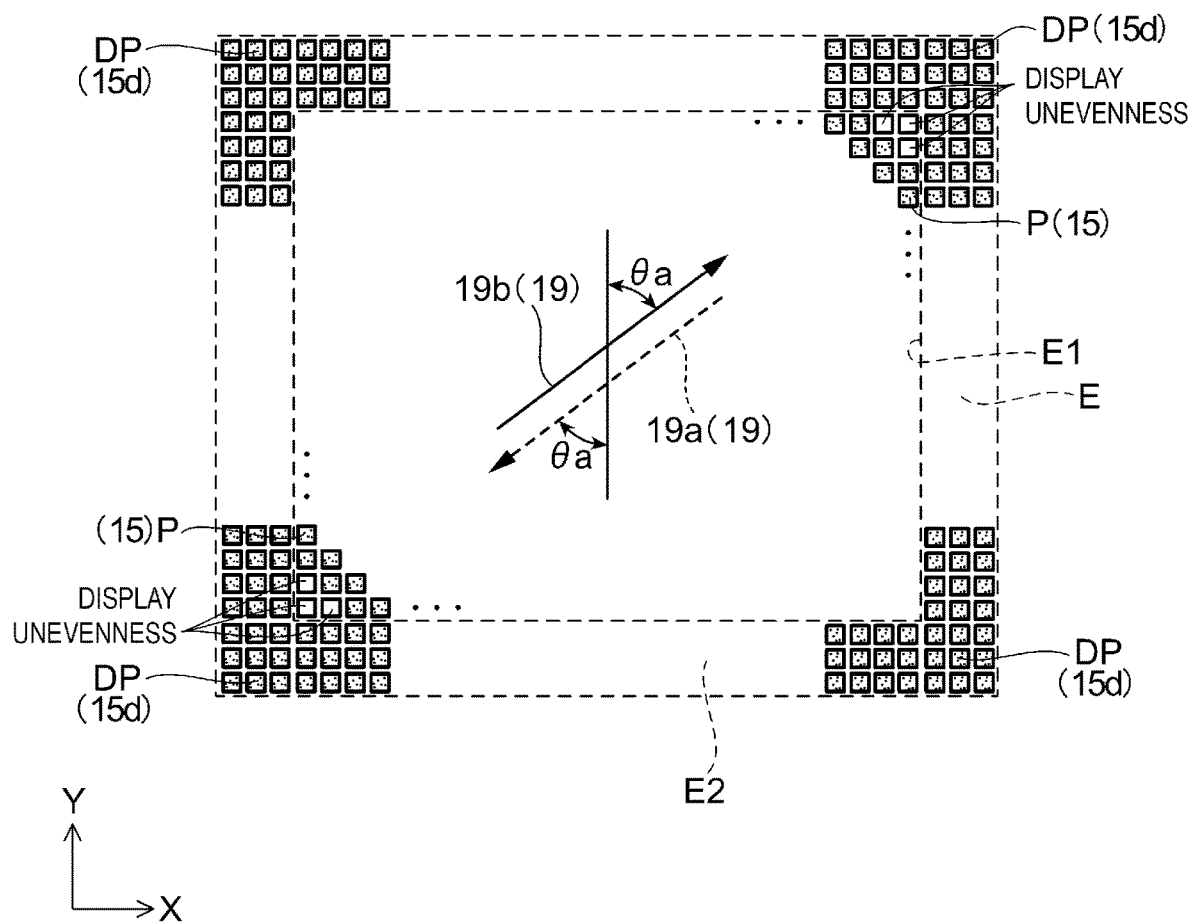
FIG. 5 is a schematic plan view illustrating a relation between an oblique deposition direction of an inorganic material and a display malfunction attributed to ionic impurities.

FIG. 5 is a schematic plan view illustrating a relation between an oblique deposition direction of an inorganic material and a display malfunction attributed to ionic impurities. As illustrated in FIG. 5, the pixel region E includes a display region E1 in which the pixels P contributed to display are arranged in a matrix in the X direction and in the Y direction, and a dummy pixel region E2 in which a plurality of dummy pixels DP are arranged in such a manner as to surround the display region E1. The pixel electrode 15 is arranged in the pixel P, and a dummy pixel electrode 15d is arranged in the dummy pixel DP. In the exemplary embodiment, the shapes of the pixel P (the pixel electrode 15) and the dummy pixel DP (the dummy pixel electrode 15d) in a plan view are squares, but not limited to this.

Further, in the exemplary embodiment, on both sides with the display region E1 interposed in the X direction and in the Y direction, three dummy pixels DP are respectively arranged, but the number of dummy pixels DP is not limited to this. At least two dummy pixels DP may be respectively arranged on both sides with the display region E1 interposed in the X direction and in the Y direction from the perspective of applying a driving method for the liquid crystal display 100 to be described later.

The oblique deposition direction of the inorganic material forming the columnar bodies 18a and 25a (see FIG. 4) that serve as the alignment films 18 and 25, as illustrated in FIG. 5, for example, is a direction intersecting with the Y direction at a predetermined angle θa from the upper right to the lower left as illustrated by a dashed-line arrow 19a on the element substrate 10 side. On the counter substrate 20 side arranged opposite to the element substrate 10, the oblique deposition direction is a direction intersecting with the Y direction at a predetermined angle θa from the lower left to the upper right as illustrated by a solid-line arrow 19b. The predetermined angle is 45 degrees, for example.

Note that, in the exemplary embodiment, the oblique deposition directions 19a and 19b that are directions in which the liquid crystal molecules LC (see FIG. 4) behave (vibrate) in a plan view are also referred to as an alignment direction 19. The deposition directions 19a and 19b (alignment direction 19) illustrated in FIG. 5 are directions in a case that the liquid crystal apparatus 100 is viewed from the counter substrate 20 side, but not limited to the directions illustrated in FIG. 5.

Driving the liquid crystal layer 50 causes the behavior (vibration) of the liquid crystal molecules LC, and in the vicinity of an interface between the liquid crystal layer 50 and the alignment films 18 and 25, the flow (flow) of the liquid crystal molecules LC is generated in the oblique deposition directions 19a and 19b (alignment direction 19) illustrated by a dashed-line arrow or a solid-line arrow illustrated in FIG. 5. When ionic impurities having positive or negative polarity are included in the liquid crystal layer 50, the ionic impurities may move to the corner section of the display region E1 in which the pixels P contributed to display are arranged, along the flow (flow) of the liquid crystal molecules LC, that is, along the alignment direction 19, and may be unevenly distributed (aggregated).

When the insulation resistance of the liquid crystal layer 50 in the pixels P positioned at the corner section is reduced due to the maldistribution of the ionic impurities, the reduction in the driving potential of the pixels P is caused, and the display unevenness or burn-in phenomenon due to current application as illustrated in FIG. 5 becomes conspicuous. In particular, in a case that the inorganic alignment film is used for the alignment films 18 and 25, the inorganic alignment film easily absorbs the ionic impurities, and thus stains or unevenness on display, and a burn-in phenomenon due to the maldistribution of the ionic impurities becomes more conspicuous, compared with the organic alignment film.

It is conceivable that the ionic impurities are included in, for example, an adhesive agent or the sealant 42 used in the process of manufacturing the liquid crystal panel 110 or intrude from the environment of the process. In addition, since the liquid crystal apparatus 100 of the exemplary embodiment can be used for an optical modulation means (light valve) of a projection-type display apparatus (projector) described later, the intensity of incident illumination light is high, compared with the intensity of incident illumination light of a direct-view liquid crystal apparatus. The incidence of the illumination light having high intensity to the liquid crystal layer 50 may cause the terminal group of the liquid crystal molecules LC being an organic compound to be detached and developed into the ionic impurities.

The liquid crystal apparatus 100 of the exemplary embodiment includes a circuit configuration in which the driving method of the liquid crystal apparatus that can restrain the partial maldistribution of the ionic impurities in the plane of the display region E1 is applied, to reduce the display malfunction due to the aforementioned ionic impurities.

Circuit Configuration of Liquid Crystal Apparatus

Figure 6:
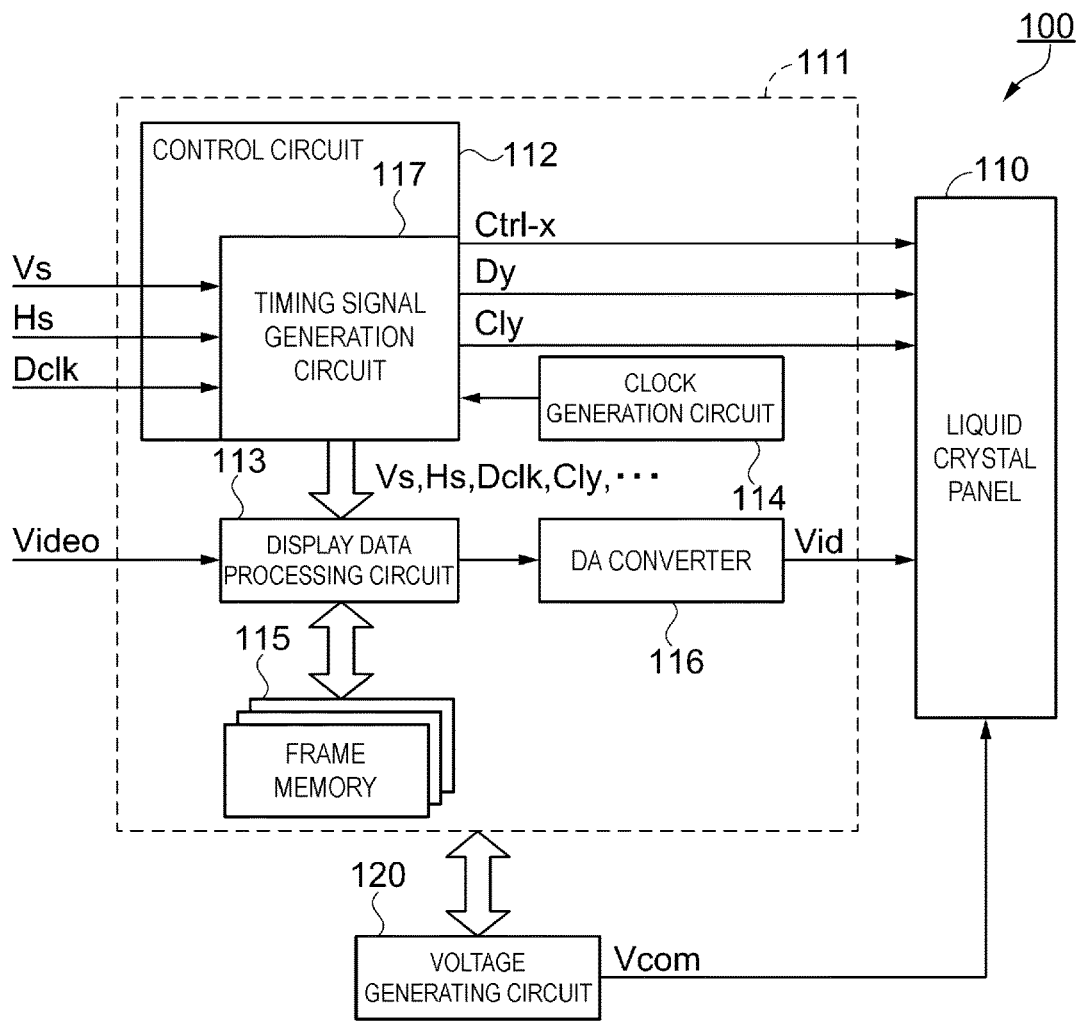
FIG. 6 is a block diagram illustrating the electrical configuration of the liquid crystal apparatus according to the first exemplary embodiment.
Figure 7:
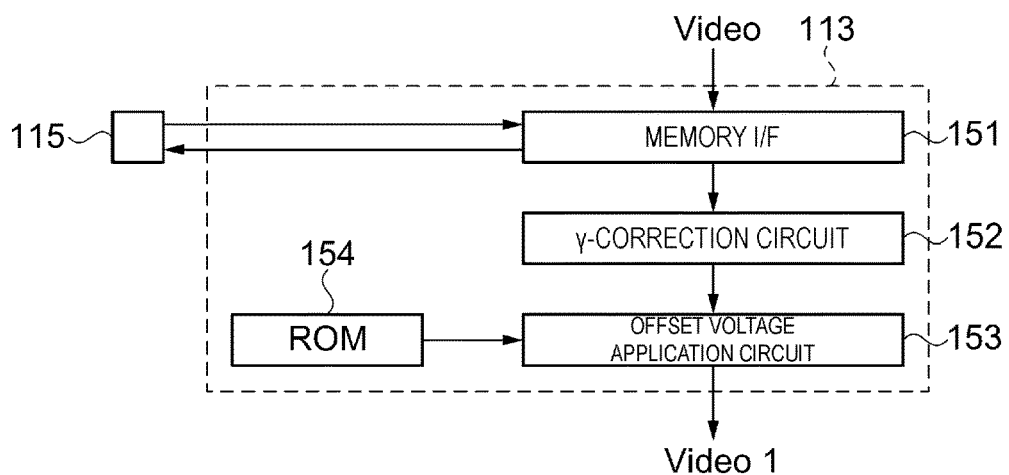
FIG. 7 is a block diagram illustrating the configuration of a display data processing circuit.

Next, the circuit configuration of the liquid crystal apparatus 100 will be described with reference to FIGS. 6 and 7. FIG. 6 is a block diagram illustrating the electrical configuration of the liquid crystal apparatus according to the first exemplary embodiment. FIG. 7 is a block diagram illustrating the configuration of a display data processing circuit.

As illustrated in FIG. 6, the liquid crystal apparatus 100 of the exemplary embodiment includes the liquid crystal panel 110, a control device 111, and a voltage generation circuit 120. The liquid crystal panel 110, as described above, is of an active matrix driving reflective type.

The voltage generation circuit 120 is configured to include a DC/DC converter and the like. The voltage generation circuit 120 generates a multiple-level direct current voltage used in each unit of the liquid crystal apparatus 100 under the control of a control device 111. For example, the voltage generation circuit 120 generates a counter electrode voltage (Vcom) applied to the counter electrode 23 (see FIG. 2) of the liquid crystal panel 110 and outputs the counter electrode voltage to the liquid crystal panel 110. Electric power necessitated by the voltage generation circuit 120 to generate the various voltages described above is supplied, for example, from a power source inside or outside of the liquid crystal apparatus 100.

The control device 111 includes a circuit module for controlling the operation of the liquid crystal panel 110 and the like in response to the input of display data Video or various control signals. The control device 111, for example, is connected to the liquid crystal panel 110 via a flexible print circuit (FPC). The control device 111 includes a control circuit 112, a display data processing circuit 113, a clock generation circuit 114, a frame memory 115, and a DA converter 116.

The control circuit 112 comprehensively controls the control device 111 and the voltage generation circuit 120. The control circuit 112 is connected to the liquid crystal panel 110 and connected to the display data processing circuit 113 and the clock generation circuit 114 in the control device 111. A timing signal generation circuit 117 is incorporated in the control circuit 112.

The clock generation circuit 114 generates a clock signal serving as a reference for the control operation of each unit and outputs the clock signal to the timing signal generation circuit 117. The timing signal generation circuit 117 generates various control signals for controlling the liquid crystal panel 110 based on the clock signal input from the clock generation circuit 114, a vertical synchronizing signal Vs, a horizontal synchronizing signal Hs, and a dot clock signal Dclk, supplied from an external device (not illustrated). The timing signal generation circuit 117 outputs the generated control signal Ctrl-x, trigger signal Dy, and clock signal Cly to the liquid crystal panel 110. In addition, the timing signal generation circuit 117 outputs the vertical synchronizing signal Vs, the horizontal synchronizing signal Hs, the dot clock signal Dclk, and the like to the display data processing circuit 113 while adjusting timing.

The display data processing circuit 113 is connected to the control circuit 112, the frame memory 115, and the DA converter 116. As illustrated in FIG. 7, the display data processing circuit 113 includes a memory I/F 151, a γ-correction circuit 152, an offset voltage application circuit 153, and a storage circuit (ROM) 154.

The memory I/F 151 sequentially stores the display data Video input to the display data processing circuit 113 in the frame memory 115. In addition, the memory I/F 151 reads the display data Video to be displayed on the liquid crystal panel 110 from the frame memory 115 and outputs the display data Video to the γ-correction circuit 152. The display data Video is an image signal that defines the gradation of the pixels P in the liquid crystal panel 110. Each unit of the display data processing circuit 113 delivers the display data Video by unit of one frame.

The γ-correction circuit 152 performs gradation correction with respect to the input display data Video to correspond to the display characteristics of the liquid crystal panel 110 (see FIG. 6). The display data Video after the γ-correction is output to the offset voltage application circuit 153.

The offset voltage application circuit 153 applies a predetermined offset voltage to the display data Video input from the γ-correction circuit 152 and generates correction display data Video1. The offset voltage application circuit 153 outputs the generated correction display data Video1 to the DA converter 116 (see FIG. 6). Applying the predetermined offset voltage to the display data Video means that the center voltage of the alternating current voltage formed in a rectangular waveform and applied to the pixel electrode 15 (see FIG. 2) is set (offset) by being shifted to a potential higher or lower than the counter electrode potential (Vcom).

The storage circuit 154 is a read-only memory (ROM) that retains a look-up table (LUT) referred to by the offset voltage application circuit 153. The LUT retained by the storage circuit 154 is a table that stores a relation between a data address of each pixel P for the display data Video and an offset voltage of each pixel to be applied. In other words, the LUT is a table that stores the distribution of the offset voltage of the plurality of pixels P in the pixel region E of the liquid crystal panel 110. Note that the LUT similarly stores the distribution of the offset voltage of the plurality of dummy pixels DP in the pixel region E.

The DA converter 116 illustrated in FIG. 6 converts the correction display data Video1 input from the display data processing circuit 113 (the offset voltage application circuit 153) into an analog data signal Vid (driving voltage) and outputs the generated analog data signal Vid to the liquid crystal panel 110.

The vertical synchronizing signal Vs of the exemplary embodiment has a frequency of 120 Hz (a period of 8.33 msec), but the application scope of the invention is not limited to the frequency of the vertical synchronizing signal Vs. The dot clock signal Dclk defines a period of time in which the display data Video corresponding to one pixel is supplied. That is, the control circuit 112 controls each unit in synchronism with the supply of the display data Video.

Note that the control device 111 that includes the display data processing circuit 113 including the offset voltage application circuit 153 is one example of the alternating current voltage generation circuit of the invention.

Driving Method of Liquid Crystal Apparatus

Figure 8:
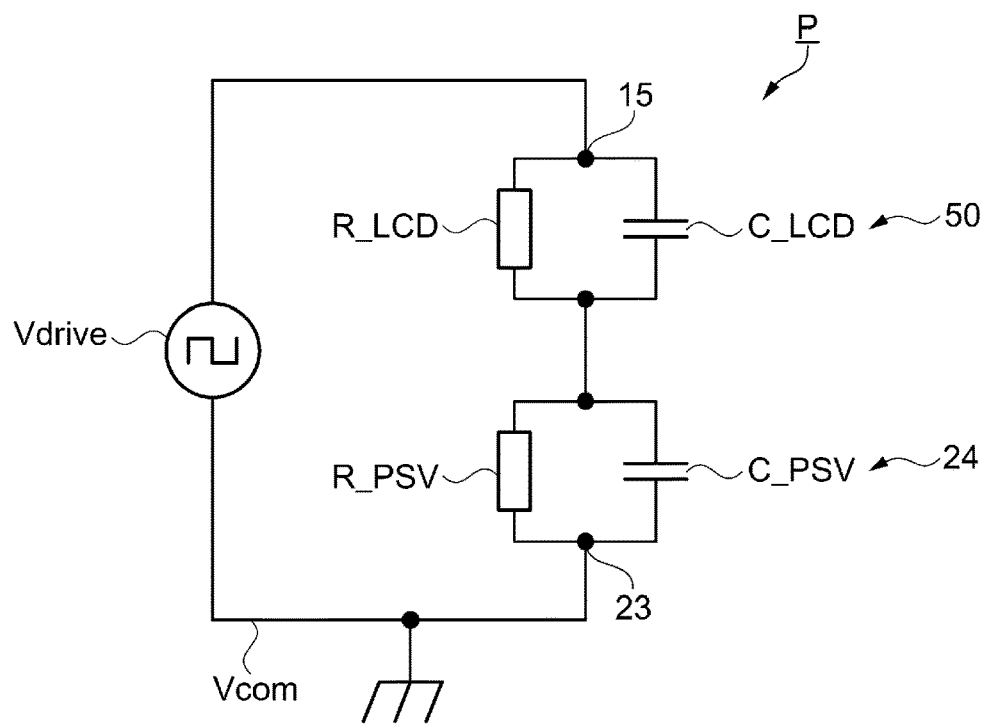
FIG. 8 is an equivalent circuit diagram of the pixel according to the first exemplary embodiment.

Next, the driving method of the liquid crystal apparatus 100 of the exemplary embodiment will be described with reference to FIGS. 8 to 11. FIG. 8 is an equivalent circuit diagram of the pixel according to the first exemplary embodiment.

The driving method of the liquid crystal apparatus 100 of the exemplary embodiment applies an alternating current voltage set in such a manner as to include a potential gradient between microscopic regions with reference to the counter electrode potential (Vcom) to the plurality of pixel electrodes 15 in the plane of the display region E in which the plurality of pixel electrodes 15 are arranged.

As illustrated in FIG. 8 the pixel P is represented as a configuration including the liquid crystal layer 50 and the insulating film 24 that are electrically connected in series between the pixel electrode 15 and the counter electrode 23. The liquid crystal layer 50 is represented as a configuration in which a resistance component R_LCD and a capacitance component C_LCD are electrically connected in parallel. The insulating film 24 covering the counter electrode 23 is represented as a configuration in which a resistance component R_PSV and a capacitance component C_PSV are electrically connected in parallel. Note that an equivalent circuit of the dummy pixel DP is represented similarly to the equivalent circuit of the pixel P.

Figure 9:
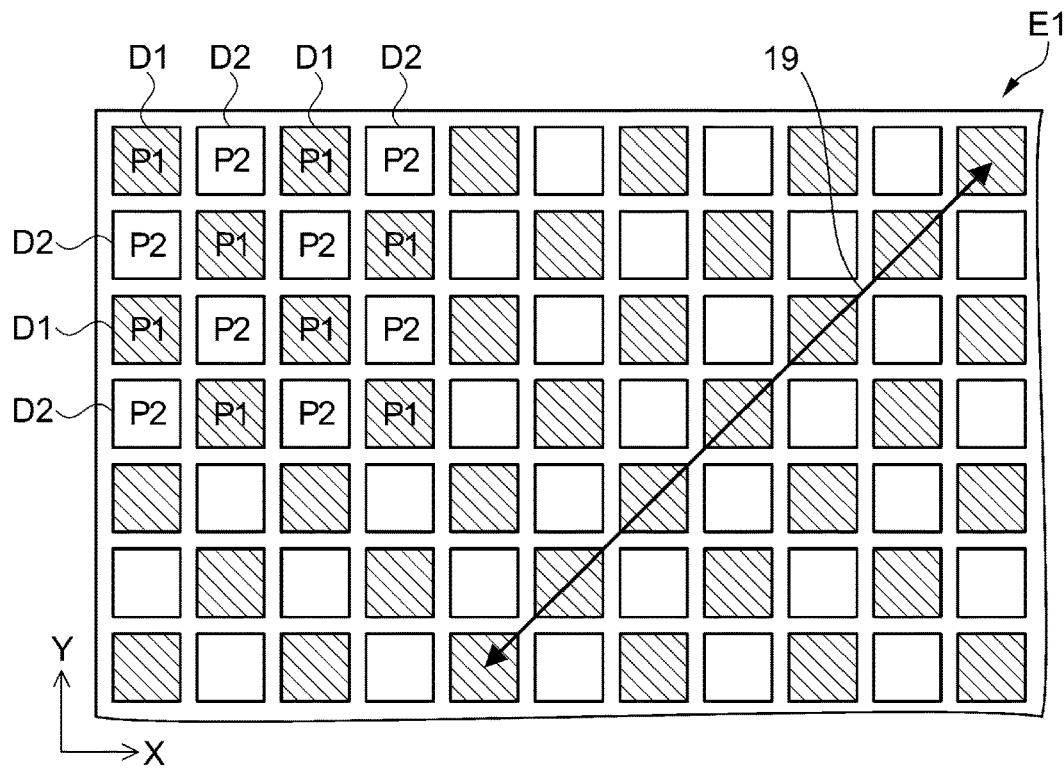
FIG. 9 is a schematic plan view illustrating an offset state of a center potential of an alternating current voltage applied to a plurality of pixel electrodes with respect to a counter electrode potential in a display region according to the first exemplary embodiment.

FIG. 9 is a schematic plan view illustrating an offset state of the center potential of an alternating current voltage applied to a plurality of pixel electrodes with respect to a counter electrode potential in the display region according to the first exemplary embodiment. In FIG. 9, a part of the display region E1 in which a plurality of pixels P (P1, P2) are arrayed is illustrated. In addition, in FIG. 9, the alignment direction 19 is illustrated by an arrow.

As illustrated in FIG. 9, first regions D1 and second regions D2 are arranged as microscopic regions in the display region E1. With reference to the counter electrode potential (Vcom), the center potential of an alternating current voltage applied to the first regions D1 is offset to a high potential side, and the center potential of an alternating current voltage applied to the second regions D2 is offset to a low potential side. This causes a potential gradient between the first regions D1 and the second regions D2.

In the exemplary embodiment, in the plane of the display region E1, an alternating current voltage set in a manner that the first regions D1 and the second regions D2 are arranged in a checkered pattern (checker pattern or checkerboard pattern), that is, a so-called plaid pattern is applied. In other words, the alternating current voltage set in such a manner that the first regions D1 and the second regions D2 are alternately arranged in respective directions including the X direction, the Y direction, the alignment direction 19, and a direction orthogonal to the alignment direction 19 is applied.

In addition, in the exemplary embodiment, the alternating current voltage set in such a manner that the first region D1 includes one pixel P (P1) and the second region D2 includes one pixel P (P2) is applied to the plurality of pixel electrodes 15. That is, the alternating current voltage set in such a manner that the pixels P1 and the pixel P2 are alternately arranged in respective directions including the X direction, the Y direction, the alignment direction 19, and the direction orthogonal to the alignment direction 19 is applied to the plurality of pixel electrodes 15. Note that the alignment direction 19 is a direction intersecting with the Y direction at a predetermined angle θa (45 degrees in the exemplary embodiment) (see FIG. 5).

Figure 10:
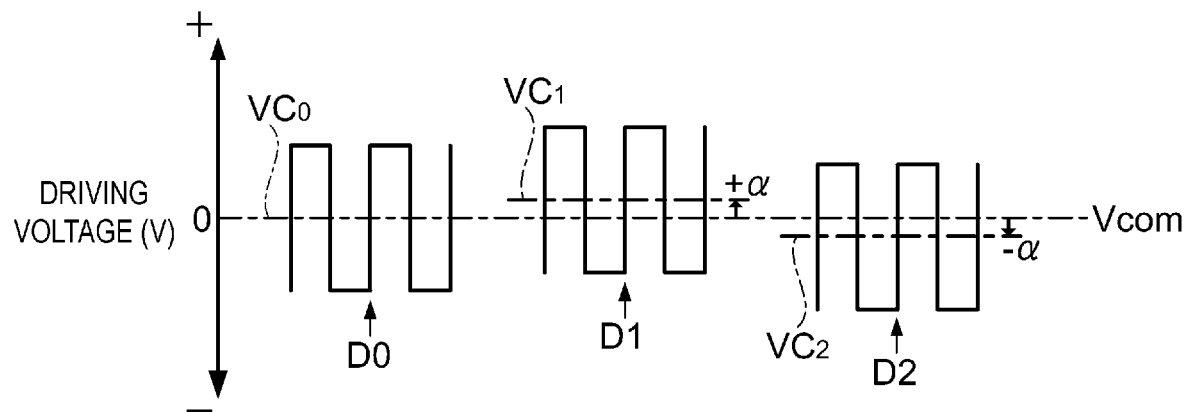
FIG. 10 is a graph illustrating a relation between an alternating current voltage applied to a pixel electrode and a counter electrode potential applied to a counter electrode according to the first exemplary embodiment.

FIG. 10 is a graph illustrating a relation between an alternating current voltage applied to the pixel electrode and the counter electrode potential applied to the counter electrode according to the first exemplary embodiment. Note that in FIG. 10, the waveform of the alternating current voltage applied to the pixel electrode 15 in the first region D1, the waveform of the alternating current voltage applied to the pixel electrode 15 in the second region D2, and the waveform of the alternating current voltage (depicted as D0 in FIG. 10) in a state in which an offset voltage is not applied are illustrated.

As illustrated in FIG. 10, the alternating current voltage in a state (D0) in which an offset voltage is not applied is a rectangular wave, and the center potential $VC_0$ of the alternating current voltage is identical to the counter electrode potential (Vcom) and, for example, is 0 (V). In contrast, the center potential $VC_1$ of the alternating current voltage (rectangular wave) applied to the pixel electrode 15 in the first region D1 is offset by α (mV) to a high potential (+) side with reference to the counter electrode potential (Vcom). The center potential $VC_2$ of the alternating current voltage (rectangular wave) applied to the pixel electrode 15 in the second region D2 is offset by α (mV) to a low potential (−) side with reference to the counter electrode potential (Vcom). Note that the absolute value of the voltage α (mV) to be offset may be set to 100 mV or more from the perspective of suppressing the maldistribution of the ionic impurities.

In FIGS. 6 and 7, the liquid crystal apparatus 100, for example, supplies a potential of 0V as the counter electrode potential (Vcom) from the voltage generation circuit 120 to the liquid crystal panel 110. On the other hand, the liquid crystal apparatus 100 outputs the alternating current voltage set in such a manner that the center potential is offset with reference to the counter electrode potential (Vcom) in the plane of the display region E1, from the DA converter 116 of the control device 111 to the liquid crystal panel 110.

The display data processing circuit 113 refers to the LUT retained in the storage circuit 154, applies a predetermined offset voltage to the display data Video input from the γ-correction circuit 152 in accordance with a value of an offset voltage preset for each of the pixels P in the display region E1, generates the correction display data Video1, and outputs the correction display data Video1 to the DA converter 116. The DA converter 116 converts the input correction display data Video1 into an analog signal and outputs the analog signal as the data signal Vid to the liquid crystal panel 110.

As illustrated in FIG. 10, an alternating current voltage whose center potential $VC_1$ is offset by +a mV (e.g., +100 mV) with respect to 0 V that is the counter electrode potential (Vcom) is applied to the pixel electrode 15 of the pixel P1 positioned in the first region D1. In contrast, an alternating current voltage whose center potential $VC_2$ is offset by −α mV (e.g., −100 mV) with respect to 0 V that is the counter electrode potential (Vcom) is applied to the pixel electrode 15 of the pixel P2 positioned in the second region D2.

Figure 11:
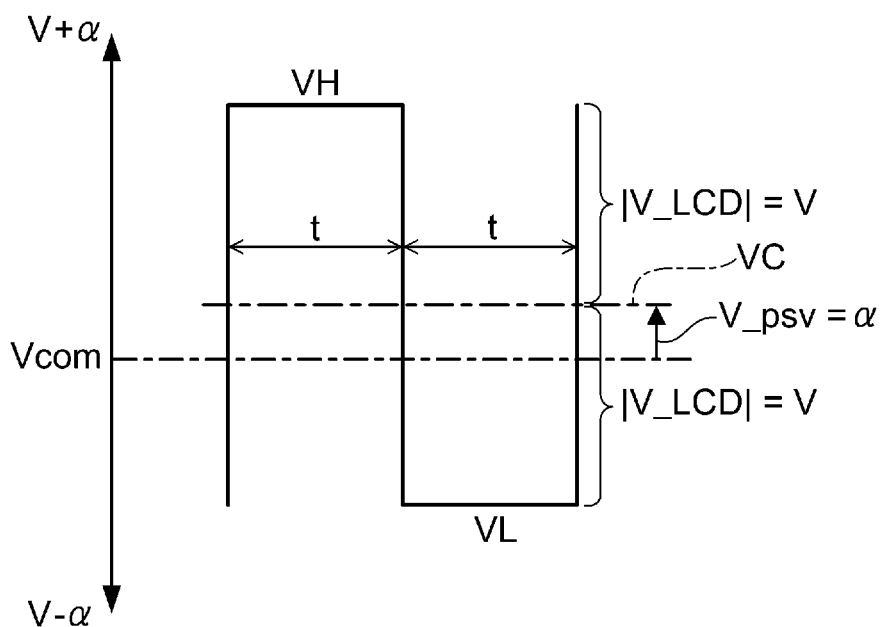
FIG. 11 is a graph illustrating a relation between the alternating current voltage applied to the pixel electrode and a surface potential applied to an insulating film according to the first exemplary embodiment.

FIG. 11 is a graph illustrating a relation between the alternating current voltage applied to the pixel electrode and a surface potential applied to an insulating film according to the first exemplary embodiment. As illustrated in FIG. 11, it is assumed that the center potential VC of the alternating current voltage applied to the pixel electrode 15 is offset by +α (mV). When the rectangular wave of the alternating current voltage is of the positive polarity (high potential VH) with respect to the counter electrode potential (Vcom), an interface in-between voltage of the insulating film 24 that covers the counter electrode 23 becomes equal to the surface potential V_psv of the insulating film 24 because the counter electrode potential (Vcom) is 0 V. When a charge amount moving in the direction in which the insulating film 24 is charged during the half period of the positive polarity (high potential VH) is Q_psv(p), a charge movement amount Q_psv(p) is given by Mathematical Formula (1) described below.

Mathematical Formula 1

$$Q\_psv(p) = (V + \alpha - V\_psv)/R\_LCD \times t \qquad (1)$$

As illustrated in FIG. 8, R_LCD is an electric resistance component of the liquid crystal layer 50, and t is a time of the half period (one frame) of the alternating current voltage.

When the rectangular wave of the alternating current voltage is of the negative polarity (low potential VL) with respect to the counter electrode potential (Vcom), and a charge amount moving in the direction in which the insulating film 24 is charged during the half period of the negative polarity (low potential VL) is Q_psv(n), a charge movement amount Q_psv(n) is given by Mathematical Formula (2) described below.

Mathematical Formula 2

$$Q\_psv(n) = -(V-\alpha+V\_psv)/R\_LCD \times t \quad (2)$$

Consequently, a charge amount Q_psv moving in the direction in which the insulating film 24 is charged during one period of the alternating current voltage is represented by the sum of the charge movement amount of the positive polarity (high potential VH) and the charge movement amount of the negative polarity (low potential VL), and thus the charge amount Q_psv is given by Mathematical Formula (3).

Mathematical Formula 3

$$Q\_psv(p)+Q\_psv(n) = (2\alpha-2V\_psv)/R\_LCD \times t \quad (3)$$

When a state of equilibrium is reached after a sufficient time elapses, an average value of one period of the alternating current voltage of the interface in-between voltage of the insulating film 24 converges to a certain constant value and eventually does not change. This is equivalent to a case that the sum (Q_psv(p)+Q_psv(n)) of the charge amount moving in the direction in which the insulating film 24 is charged during one period of the alternating current voltage represented by Mathematical Formula (3) reaches "0".

Consequently, the right side $((2\alpha+2V\_psv)/R\_LCD \times t)$ of Mathematical Formula (3) also reaches "0". That is, V_psv=α is given, and in this case, the interface in-between voltage of the insulating film 24 that has reached a state of equilibrium=the surface potential V_psv reaches +α (mV). Similarly, when the center potential of the alternating current voltage applied to the pixel electrode 15 is offset by −α (mV), the surface potential V_psv of the insulating film 24 that has reached a state of equilibrium, in this case, becomes −α (mV).

When the center potential VC of the alternating current voltage applied to the pixel electrode 15 is not offset with respect to the counter electrode potential (Vcom), a DC component is not generated, and thus the surface potential V_psv of the insulating film 24 in a state of equilibrium reaches 0 V identical to the counter electrode potential (Vcom).

In contrast, the polarity of a voltage V_LCD applied to the liquid crystal layer 50 is inverted for each half period (one frame) with respect to the center potential VC, but an absolute value |V_LCD| of the voltage V_LCD becomes V in any polarity. That is, as described above, a predetermined voltage V based on the data signal Vid is applied to the liquid crystal layer 50. Consequently, the absolute value |V_LCD| of the voltage V_LCD actually applied to the liquid crystal layer 50=V is constant in the first region D1 (pixel P1) and the second region D2 (pixel P2).

Note that even when the center potentials $VC_1$ and $VC_2$ of the alternating current voltages applied to the plurality of pixel electrodes 15 are offset to the counter electrode potential (Vcom), the DC component is charged to the insulating film 24, and an effective driving voltage corresponding to the alternating current voltage is applied to the liquid crystal layer 50, and thus the DC component is hard to affect the displaying. In addition, when the drive of the liquid crystal apparatus 100 is stopped, the DC component charged to the insulating film 24 is discharged through the voltage generation circuit 120, and thus a display malfunction, such as burn-in does not occur.

Figure 12:
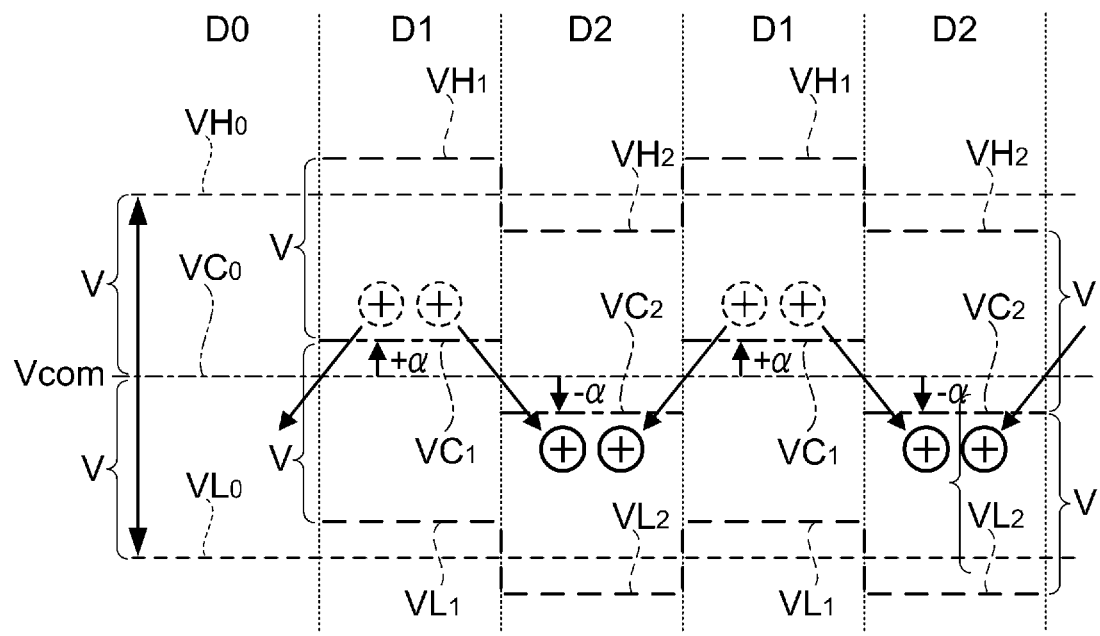
FIG. 12 is a graph illustrating a relation between an offset voltage and movement of ionic impurities having positive polarity according to the first exemplary embodiment.
Figure 13:
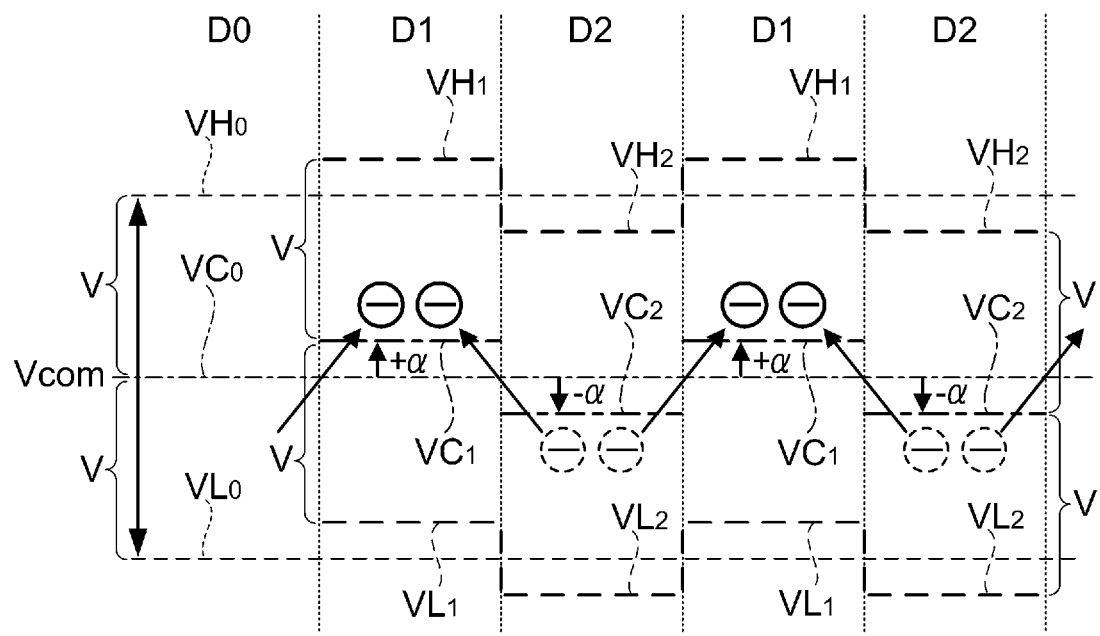
FIG. 13 is a graph illustrating a relation between an offset voltage and movement of ionic impurities having negative polarity according to the first exemplary embodiment.

Subsequently, the suppression of the maldistribution of the ionic impurities in the plane of the display region E1 by the driving method for the liquid crystal display 100 of the exemplary embodiment will be described with reference to FIGS. 12 and 13. FIG. 12 is a graph illustrating a relation between an offset voltage and a movement of an ionic impurity having positive polarity according to the first exemplary embodiment. FIG. 13 is a graph illustrating a relation between an offset voltage and a movement of an ionic impurity having negative polarity according to the first exemplary embodiment.

In FIGS. 12 and 13, the center potential $VC_1$, the high potential $VH_1$, and the low potential $VL_1$ of the rectangular wave of the alternating current voltage applied to the first region D1 and, the center potential $VC_2$, the high potential $VH_2$, and the low potential $VL_2$ of the rectangular wave of the alternating current voltage applied to the second region D2 are illustrated with reference to the center potential $VC_0$, the high potential $VH_0$, and the low potential $VL_0$ of the rectangular wave of the alternating current voltage in a state (D0) in which an offset voltage is not applied. In the state (D0) in which an offset voltage is not applied, it is assumed that the absolute value |V_LCD| of the voltage applied to the liquid crystal layer 50 is V, at the high potential $VH_0$ having positive polarity and the low potential $VL_0$ having negative polarity.

As described above, in the first region D1, the center potential $VC_1$ of the alternating current voltage applied to the pixel electrode 15 is offset by +α mV with respect to the counter electrode potential (Vcom) that is the center potential $VC_0$ in the state (D0) in which an offset voltage is not applied. In the first region D1, the absolute value of the alternating current voltage applied to the liquid crystal layer 50 is |V_LCD|=V identical to a voltage value in the state (D0) in which an offset voltage is not applied, at the high potential $VH_1$ having positive polarity and the low potential $VL_1$ having negative polarity.

In the second region D2, the center potential $VC_2$ of the alternating current voltage applied to the pixel electrode 15 is offset by −α mV with respect to the counter electrode potential (Vcom) that is the center potential $VC_0$ in the state (D0) in which an offset voltage is not applied. In the second region D2, the absolute value of the alternating current voltage applied to the liquid crystal layer 50 is also |V_LCD|=V identical to the voltage value in the state (D0) in which an offset voltage is not applied, at the high potential $VH_2$ having positive polarity and the low potential $VL_2$ having negative polarity.

As described above, in the display region E1, an alternating current voltage set in such a manner that the first regions D1 (pixel P1) and the second regions D2 (pixel P2) are alternately arranged in respective directions including the X direction, the Y direction, the alignment direction 19, and a direction orthogonal to the alignment direction 19 is applied to the plurality of pixel electrodes 15. Thus, between the first region D1 offset by +α mV and the adjacent second region D2 offset by −α mV, a potential gradient is generated in accordance with an offset amount in the surface potential V_psv of the insulating film 24 that covers the counter electrode 23.

Thus, as illustrated in FIG. 12, the ionic impurities having positive polarity illustrated by a plus (+) sign move in the liquid crystal layer 50 from the first regions D1 offset to the high potential side to the second regions D2 offset to the low potential side. In addition, as illustrated in FIG. 13, the ionic impurities having negative polarity illustrated by a minus (−) sign move in the liquid crystal layer 50 from the second regions D2 offset to the low potential side to the first regions D1 offset to the high potential side.

As a matter of course, the potential of the pixel electrode 15 includes a potential gradient identical to the surface potential V_psv of the insulating film 24 between the first regions D1 and the second regions D2. Thus, irrespective of the position in a thickness direction in the liquid crystal layer 50, the ionic impurities having positive polarity move in the liquid crystal layer 50 from the first regions D1 to the second regions D2, and the ionic impurities having negative polarity move in the liquid crystal layer 50 from the second regions D2 to the first regions D1.

Consequently, even when the ionic impurities exist in the display region E1 in the liquid crystal layer 50, the ionic impurities move between the first regions D1 (pixel P1) and the second regions D2 (pixel P2) that are adjacently arranged in a checkered pattern in respective directions including the X direction, the Y direction, the alignment direction 19, and a direction orthogonal to the alignment direction 19, and thus the ionic impurities are dispersed in the plane of the display region E1 and hard to partially aggregate. In the exemplary embodiment, the first region D1 includes one pixel P1, and the second region D2 includes one pixel P2, and thus partial maldistribution can be suppressed by dispersing the ionic impurities for each pixel (P1, P2).

The aforementioned movement of the ionic impurities continuously occurs while the driving voltage is output to the liquid crystal panel 110. The ionic impurities having positive polarity move from the first regions D1 to the second regions D2 but does not move from the second regions D2 to the first regions D1. The ionic impurities having negative polarity move from the second regions D2 to the first regions D1 but does not move from the first regions D1 to the second regions D2. That is, the ionic impurities that have moved once stay in an region of a movement destination by an electric barrier between the first regions D1 and the second regions D2, and thus the movement of the ionic impurities along the flow of the liquid crystal molecules LC is suppressed. As a result, the maldistribution of the ionic impurities in the plane of the display region E1 can be suppressed, and thus display unevenness caused by the reduction of the insulation resistance of the liquid crystal layer 50 due to the maldistribution of the ionic impurities or a burn-in phenomenon due to current application can be suppressed.

Note that in a state in which the driving voltage is not output to the liquid crystal panel 110, the electric barrier between the first regions D1 and the second regions D2 is eliminated, which enables the free movement of the ionic impurities. However, in a case that the liquid crystal apparatus 100 is used for the light valve of a projector, in a state in which the projector does not operate, even in a case where the electric barrier between the first regions D1 and the second regions D2 is eliminated, the temperature of the liquid crystal panel 110 is not increased, and thus the movement of the ionic impurities is unlikely to occur in this state.

As described above, in accordance with the liquid crystal apparatus 100 and the driving method of the liquid crystal apparatus according to the first exemplary embodiment, the ionic impurities present in the liquid crystal layer 50 are dispersed to the first regions D1 and the second regions D2 that are arranged in a checkered pattern in the plane of the display region E1. Consequently, the partial aggregation of the ionic impurities is suppressed, and thus the liquid crystal apparatus 100 and the driving method of the liquid crystal apparatus 100 that are capable of suppressing the deterioration of display characteristics due to the partial maldistribution of the ionic impurities in the liquid crystal layer 50 can be provided.

Note that in the exemplary embodiment, the center potential VC0 of the alternating current voltage applied to the pixel electrode 15 in a state (D0) in which an offset voltage is not applied is caused to be identical to the counter electrode potential (Vcom), but it is obvious from the description above that the similar effect is obtained by a mere change of the surface potential V_psv of the insulating film 24 in a state of equilibrium even when the center potential VC0 is not caused to be identical to the counter electrode potential (Vcom). When the data signal Vid (driving voltage) from the control device 111 is transmitted to the pixel electrode via the transistor inside of the liquid crystal panel 110, offset of unignorable magnitude may occur due to the feedthrough of the transistor and the like. In this case, similarly, the center potential $VC_0$ of the alternating current voltage applied to the pixel electrode 15 in a state (D0) in which an offset voltage is not applied need not be identical to the counter electrode potential (Vcom), and this eliminates the consideration of offset caused by the feedthrough of the transistor and the like at the time of setting the LUT (look-up table) used in generating the correction display data Video1.

In addition, the liquid crystal display 100 of the exemplary embodiment is of a reflective type, and the pixel electrode 15 (dummy pixel electrode 15d) is formed by using light shielding materials, such as aluminum (Al) or an alloy of aluminum. In contrast, the counter electrode 23, for example, is formed by using a transparent conductive film such as ITO. Therefore, the counter electrode potential (Vcom) may be fluctuated by the liquid crystal layer 50 sandwiched between a pair of electrodes which are composed of different electrode materials, that is, have different work functions, but the fluctuation of the counter electrode potential (Vcom) according to the work function can be suppressed by devising the material configuration of the insulating film 24 that covers the counter electrode 23.

The modified examples of the first exemplary embodiment, for example, includes examples below.

Modified Example 1

Figure 14:
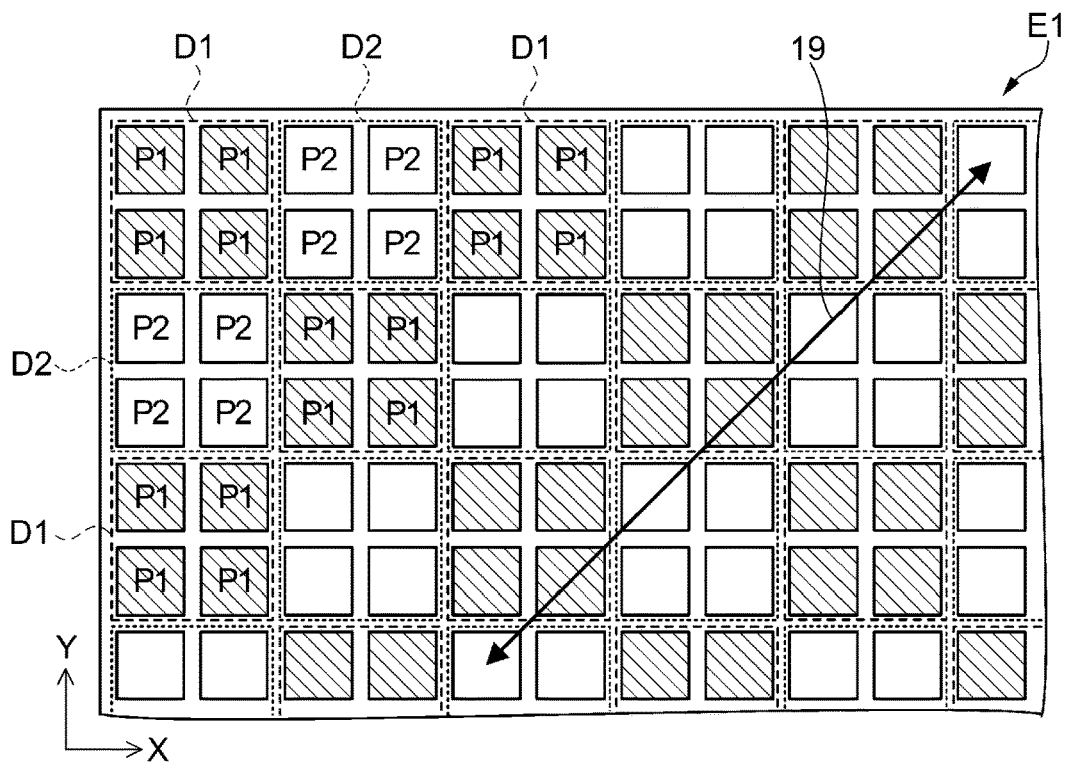
FIG. 14 is a schematic plan view illustrating an offset state of a center potential of an alternating current voltage applied to a plurality of pixel electrodes with respect to a counter electrode potential in a display region according to a first modified example.

In the exemplary embodiment, the first region D1 and the second region D2 arranged in a checkered pattern include one pixel P (P1, P2), but not limited to this configuration. The first region D1 and the second region D2 may include a plurality of pixels P (P1, P2). FIG. 14 is a schematic plan view illustrating an offset state of the center potential of an alternating current voltage applied to the plurality of pixel electrodes with respect to a counter electrode potential in a display region according to the first modified example. In the first modified example illustrated in FIG. 14, the first region D1 includes four pixels P1, and the second region D2 includes four pixels P2. Even with this configuration, the effect similar to the effect of the aforementioned exemplary embodiment can be obtained.

Modified Example 2

Figure 15:
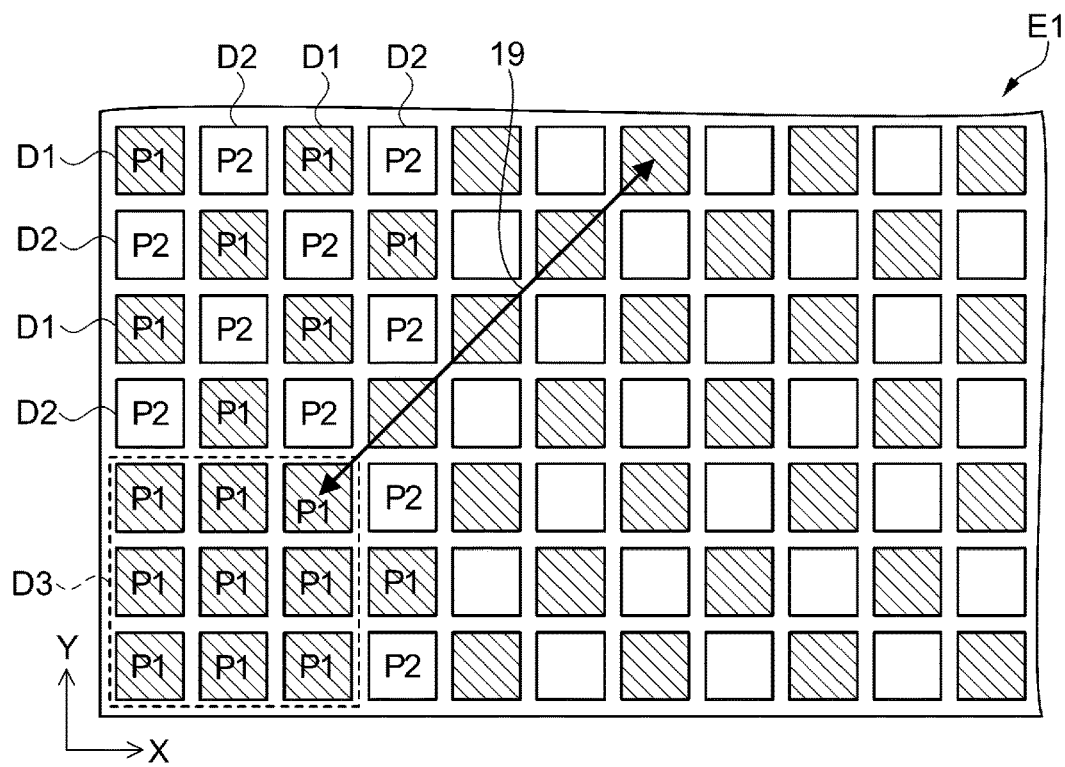
FIG. 15 is a schematic plan view illustrating an offset state of a center potential of an alternating current voltage applied to a plurality of pixel electrodes with respect to a counter electrode potential in a display region according to a second modified example.

In addition, configuration may be applied such that an alternating current voltage set in such a manner that a third region D3 in which the center potential is offset with respect to the counter electrode potential (Vcom) is arranged at a diagonal position in the plane of the display region E1, besides the first region D1 and the second region D2, is applied to the plurality of pixel electrodes 15. FIG. 15 is a schematic plan view illustrating an offset state of the center potential of an alternating current voltage applied to the plurality of pixel electrodes with respect to a counter electrode potential in a display region according to a second modified example.

In FIG. 15, a corner section at a diagonal position along the alignment direction 19 in the plane of the display region E1 is illustrated. In the second modified example, the third regions D3 including the plurality of pixels P1 are arranged in the corner section at a diagonal position along the alignment direction 19 illustrated in FIG. 15 and in the corner section (not illustrated) positioned on the opposite side of the diagonal direction along the alignment direction 19. As is the case with the first exemplary embodiment, the first regions D1 (pixel P1) and the second regions D2 (pixel P2) are arranged in a checkered pattern in sections except for the corner section at the diagonal position along the alignment direction 19 in the plane of the display region E1.

In the second modified example, the third regions D3 (the plurality of pixels P1) in which the alternating current voltage whose center potential $VC_1$ is offset by α (mV) to a high potential (+) side with respect to the counter electrode potential (Vcom) is applied to the pixel electrode 15 are arranged in the corner sections at the diagonal position along the alignment direction 19. Consequently, the ionic impurities having negative polarity move to the third regions D3 from the second regions D2 (pixels P2) adjacently positioned, but the ionic impurities having positive polarity do not move to the third regions D3 from the first regions D1 (pixels P1) adjacently positioned.

As described above, the flow of the liquid crystal molecules LC is generated along the alignment direction 19, and thus the ionic impurities are likely to move to the corner sections of the display region E1 along the alignment direction 19. In a case that it can be specified which polarity of the ionic impurities is high in number in the ionic impurities present in the liquid crystal layer 50, the third region D3 in which the center potential is offset to the potential side whose polarity is identical to the polarity of the ionic impurities (for example, when the ionic impurities having positive polarity is high in number, the center potential is offset to the high potential side) is arranged. Accordingly, the ionic impurities have positive polarity repel and do not move to the third region D3, and thus the maldistribution of the ionic impurities in the corner section at the diagonal position in the plane of the display region E1 can be suppressed.

Note that in a case that the ionic impurities having negative polarity in the liquid crystal layer 50 are high in number, the third region D3 (the plurality of pixels P2) may be configured to be arranged wherein the center potential $VC_2$ is offset to a low potential (−) side with respect to the counter electrode potential (Vcom). In addition, an offset voltage in the third region D3 may be configured to be different from the offset voltage +α (mV) or −α (mV) in the first region D1 and the second region D2.

Modified Example 3

Figure 16:
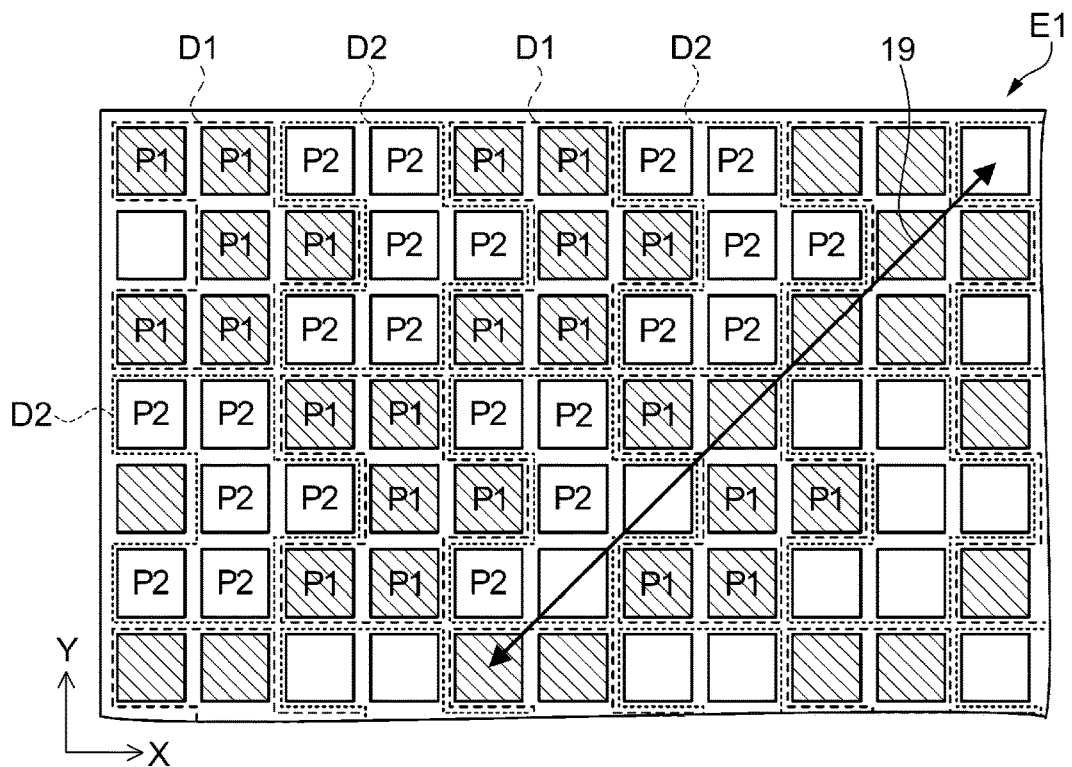
FIG. 16 is a schematic plan view illustrating an offset state of a center potential of an alternating current voltage applied to a plurality of pixel electrodes with respect to a counter electrode potential in a display region according to a third modified example.

Further, the arrangement of the first regions D1 and the second regions D2 is not limited to the checkered pattern arrangement. FIG. 16 is a schematic plan view illustrating an offset state of the center potential of an alternating current voltage applied to a plurality of pixel electrodes with respect to the counter electrode potential in a display region according to a third modified example. In the third modified example illustrated in FIG. 16, an alternating current voltage set in such a manner that the first regions D1 including the plurality of pixels P1 and the second regions D2 including the plurality of pixels P2 are arranged in the so-called hound's-tooth check is applied. In the third modified example illustrated in FIG. 16, the first regions D1 and the second regions D2 are arranged in the hound's-tooth check sideways along the X direction. Even with this configuration, the effect similar to the effect of the aforementioned exemplary embodiment can be obtained.

Modified Example 4

Figure 17:
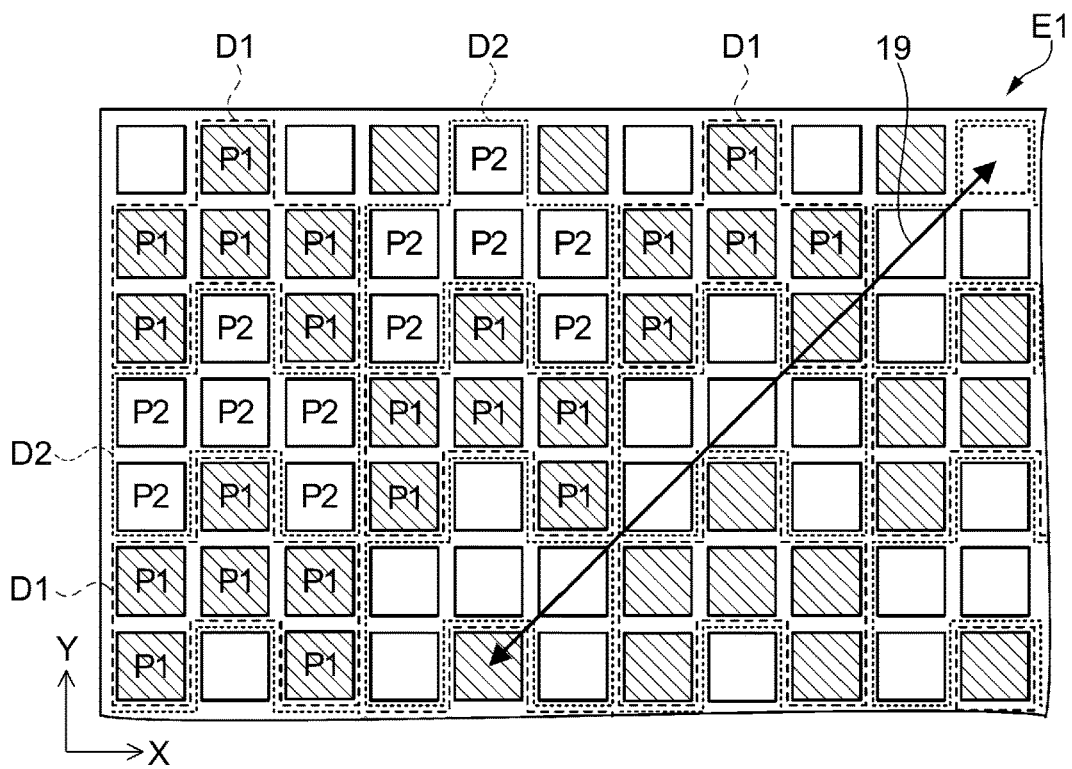
FIG. 17 is a schematic plan view illustrating an offset state of a center potential of an alternating current voltage applied to a plurality of pixel electrodes with respect to a counter electrode potential in a display region according to a fourth modified example.

FIG. 17 is a schematic plan view illustrating an offset state of the center potential of an alternating current voltage applied to a plurality of pixel electrodes with respect to a counter electrode potential in a display region according to a fourth modified example. In the fourth modified example illustrated in FIG. 17, the first regions D1 and the second regions D2 are arranged in the hound's-tooth check longitudinally along the Y direction. Even with this configuration, the effect similar to the effect of the aforementioned exemplary embodiment can be obtained.

Second Exemplary Embodiment

Next, the liquid crystal apparatus and the driving method of the liquid crystal apparatus according to a second exemplary embodiment will be described. The liquid crystal apparatus and the driving method of the liquid crystal apparatus according to the second exemplary embodiment are different from the liquid crystal apparatus and the driving method of the first exemplary embodiment in that the arrangement of the first regions D1 and the second regions D2 in the plane of the display region E1 is in a stripe pattern, but the other configuration is approximately similar in the first and second exemplary embodiments. Herein, differences with respect to the first exemplary embodiment will be described, and the identical reference numbers are applied to the elements common to the elements of the first exemplary embodiment, and their descriptions will be omitted.

Figure 18:
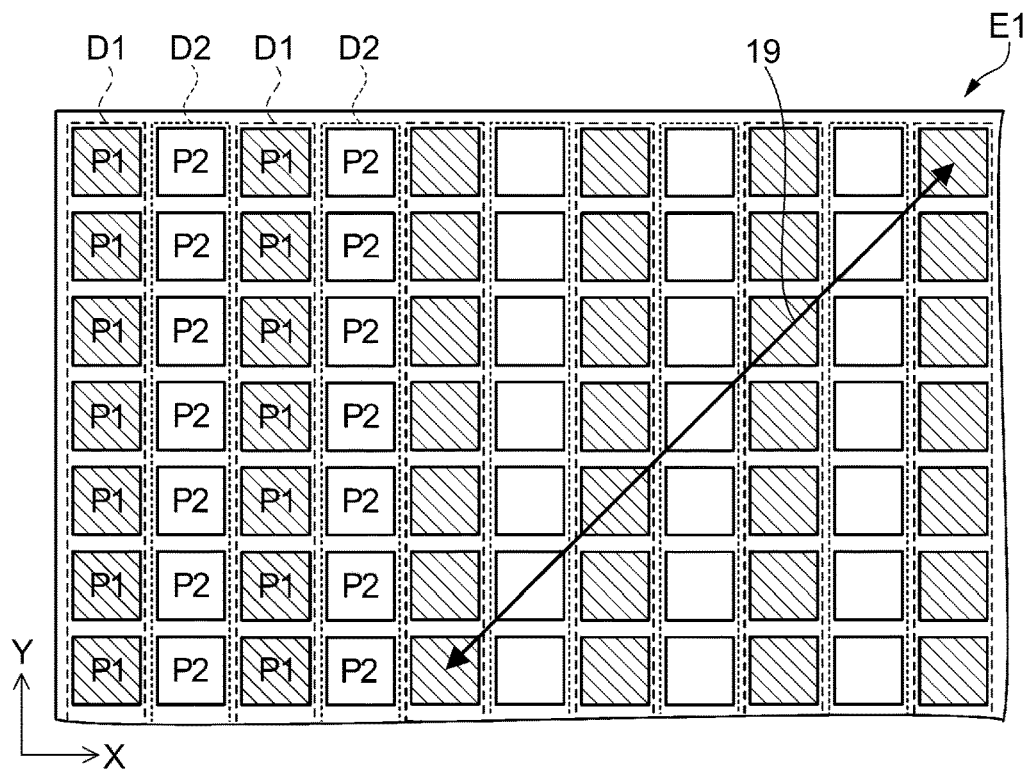
FIG. 18 is a schematic plan view illustrating an offset state of a center potential of an alternating current voltage applied to a plurality of pixel electrodes with respect to a counter electrode potential in a display region according to a second exemplary embodiment.

FIG. 18 is a schematic plan view illustrating an offset state of the center potential of an alternating current voltage applied to a plurality of pixel electrodes with respect to a counter electrode potential in a display region according to the second exemplary embodiment. As illustrated in FIG. 18, in the liquid crystal apparatus and the driving method of the liquid crystal apparatus according to the second exemplary embodiment, an alternating current voltage set in such a manner that the first regions D1 and the second regions D2 are arranged in a stripe pattern (stripe pattern) in the plane of the display region E1 is applied.

In the second exemplary embodiment, the first regions D1 and the second regions D2 are arranged in a longitudinal stripe pattern extending in the Y direction. Accordingly, the first regions D1 includes the plurality (one column) of pixels P1, and the second regions D2 includes the plurality (one column) of pixels P2. That is, in the exemplary embodiment, an alternating current voltage set in such a manner that the first regions D1 (pixels P1 in one column) and the second regions D2 (pixels P2 in one column) extending in the Y direction are alternately arranged in the X direction is applied to the plurality of pixel electrodes 15.

As illustrated in FIG. 18, the extending direction (Y direction) of the stripe pattern is a direction intersecting with the alignment direction 19 of the liquid crystal layer 50. Thus, in the exemplary embodiment, an alternating current voltage set in such a manner that the extending direction of the stripe pattern in which the first regions D1 (pixels P1 in one column) and the second regions D2 (pixels P2 in one column) are alternately arranged intersects with the alignment direction 19 of the liquid crystal layer 50 is applied to the plurality of pixel electrodes 15.

In the second exemplary embodiment, the ionic impurities having positive polarity move in the liquid crystal layer 50 from the first regions D1 (pixels P1 in one column) offset to a high potential side to the second regions D2 (pixels P2 in one column) offset to a low potential side, and the ionic impurities having negative polarity move in the liquid crystal layer 50 from the second regions D2 (pixels P2 in one column) offset to a low potential side to the first regions D1 (pixels P1 in one column) offset to a high potential side.

Thus, even when the ionic impurities exist in the display region E1 in the liquid crystal layer 50, the ionic impurities move between the first region D1 (pixels P1 in one column) and the second region D2 (pixels P2 in one column) that extend along the Y direction and are adjacent to each other, and thus the ionic impurities are dispersed in the plane of the display region E1. In addition, the ionic impurities having positive polarity that have moved from the first region D1 to the second region D2 do not move to the adjacent first region D1, and the ionic impurities having negative polarity that have moved from the second region D2 to the first region D1 do not move to the adjacent second region D2. As a result, as is the case with the exemplary embodiment, the maldistribution of the ionic impurities in the plane of the display region E1 can be suppressed.

Further, in the second exemplary embodiment, the extending direction (Y direction) of the longitudinal stripe pattern in which the first regions D1 and the second regions D2 are arranged intersects with the alignment direction 19, and thus the first regions D1 and the second regions D2 are alternately arranged in the alignment direction 19. In other words, an electric barrier between the first region D1 and the second region D2 extends in a wall shape along a direction intersecting with the alignment direction 19. This electric barrier between the first region D1 and the second regions D2 repeatedly exists along the alignment direction 19. This suppresses the movement of the ionic impurities to the corner sections in the display region E1 along the alignment direction 19, and thus the maldistribution of the ionic impurities can be effectively suppressed.

The modified examples of the second exemplary embodiment, for example, include examples below.

Modified Example 5

Figure 19:
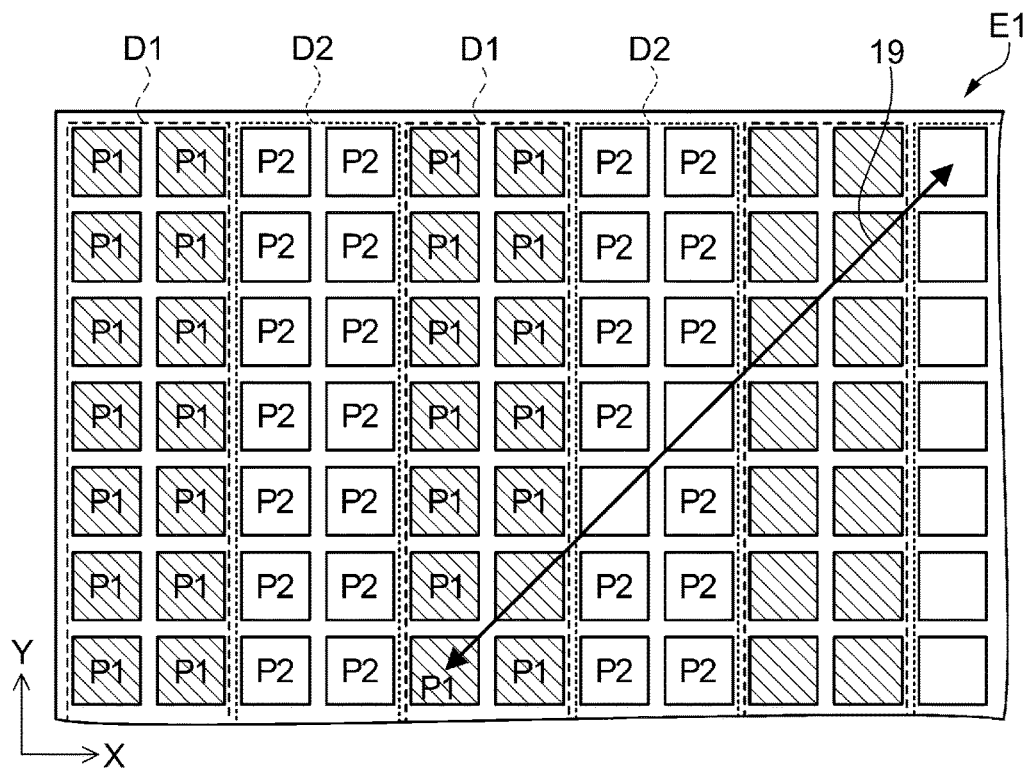
FIG. 19 is a schematic plan view illustrating an offset state of a center potential of an alternating current voltage applied to a plurality of pixel electrodes with respect to a counter electrode potential in a display region according to a fifth modified example.

FIG. 19 is a schematic plan view illustrating an offset state of the center potential of an alternating current voltage applied to a plurality of pixel electrodes with respect to a counter electrode potential in a display region according to a fifth modified example. In the fifth modified example illustrated in FIG. 19, the first regions D1 and the second regions D2 are arranged in a longitudinal stripe pattern along the Y direction, and the first regions D1 include the pixels P1 in two columns, and the second regions D2 include the pixels P2 in two columns. As the fifth modified example, even with the configuration in which an alternating current voltage set in such a manner that the first regions D1 include by the pixels P1 in multiple columns and the second regions D2 include pixels P2 in multiple columns is applied to the plurality of pixel electrodes 15, the effect similar to the effect of the second exemplary embodiment can be obtained.

Modified Example 6

Figure 20:
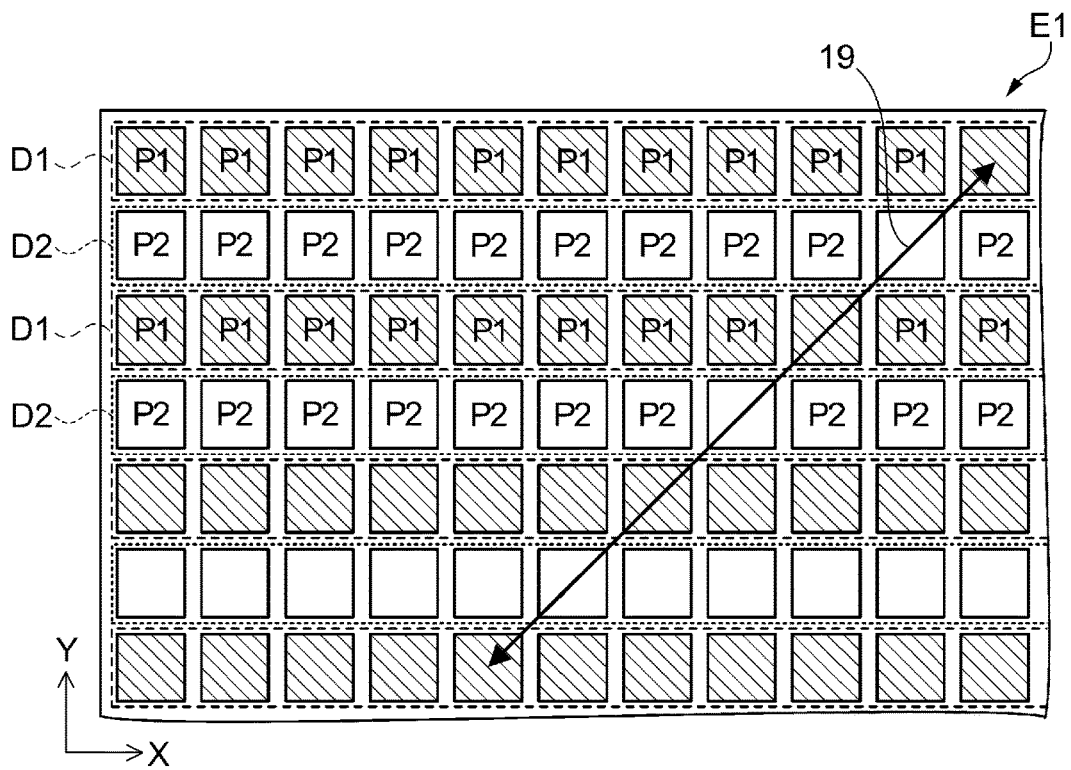
FIG. 20 is a schematic plan view illustrating an offset state of a center potential of an alternating current voltage applied to a plurality of pixel electrodes with respect to a counter electrode potential in a display region according to a sixth modified example.

FIG. 20 is a schematic plan view illustrating an offset state of the center potential of an alternating current voltage applied to a plurality of pixel electrodes with respect to a counter electrode potential in a display region according to a sixth modified example. In the sixth modified example illustrated in FIG. 20, the first regions D1 (pixels P1 in one row) and the second regions D2 (pixels P2 in one row) are arranged in a lateral stripe pattern extending in the X direction. That is, an alternating current voltage set in such a manner that the first regions D1 (pixels P1 in one row) and the second regions D2 (pixels P2 in one row) extending in the X direction are alternately arranged in the Y direction is applied to the plurality of pixel electrodes 15.

With the configuration of the sixth modified example, even when the ionic impurities exist in the display region E1 in the liquid crystal layer 50, the ionic impurities move between the first region D1 (pixels P1 in one row) and the second region D2 (pixels P2 in one row) that extend along the X direction and are adjacent to each other, and thus the ionic impurities are dispersed in the plane of the display region E1.

In addition, the extending direction (X direction) of the lateral stripe pattern in which the first regions D1 and the second regions D2 are arranged is a direction intersecting with the alignment direction 19, and thus the movement of the ionic impurities along the alignment direction 19 is suppressed by the electric barrier between the first regions D1 (pixels P1 in one row) and the second regions D2 (pixels P2 in one row). Consequently, the maldistribution of the ionic impurities can be effectively suppressed. Note that, in addition to the configuration of the sixth modified example, even with a configuration in which an alternating current voltage set in such a manner that the first regions D1 include the pixels P1 in multiple rows and the second regions D2 include pixels P2 in multiple rows is applied to the plurality of pixel electrodes 15, the effect similar to the effect of the second exemplary embodiment can be obtained.

Modified Example 7

Figure 21:
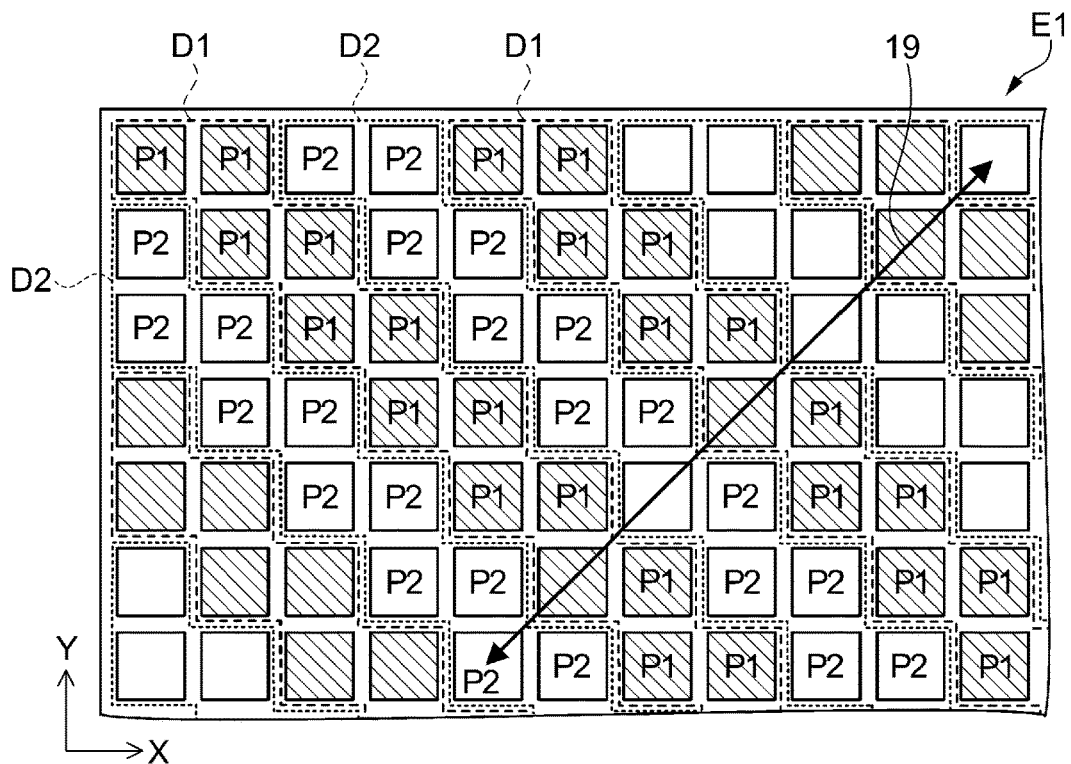
FIG. 21 is a schematic plan view illustrating an offset state of a center potential of an alternating current voltage applied to a plurality of pixel electrodes with respect to a counter electrode potential in a display region according to a seventh modified example.

FIG. 21 is a schematic plan view illustrating an offset state of the center potential of an alternating current voltage applied to a plurality of pixel electrodes with respect to a counter electrode potential in a display region according to a seventh modified example. In the seventh modified example illustrated in FIG. 21, the first regions D1 and the second regions D2 are arranged in an oblique stripe pattern extending in a direction intersecting with the X direction and the Y direction. That is, the first regions D1 and the second regions D2 extend in a direction approximately orthogonal to the alignment direction 19 and are alternately arranged along the alignment direction 19. More specifically, an alternating current voltage set in such a manner that the first regions D1 and the second regions D2 are arranged such that two pixels P1 and two pixels P2 positioned side by side in the X direction are shifted by each pixel P (P1 or P2) in the Y direction is applied to the plurality of pixel electrodes 15.

In the seventh modified example, the ionic impurities move between the first region D1 and the second region D2 that are adjacent to each other along the alignment direction 19, and thus the ionic impurities are dispersed in the plane of the display region E1. Then, the movement of the ionic impurities to the corner section in the display region E1 along the alignment direction 19 is suppressed by the electric barrier between the first region D1 and the second region D2 that extend in a wall shape along a direction approximately orthogonal to the alignment direction 19. Consequently, the maldistribution of the ionic impurities can be effectively suppressed.

Third Exemplary Embodiment

Next, the liquid crystal apparatus and the driving method of the liquid crystal apparatus according to a third exemplary embodiment will be described. The liquid crystal apparatus and the driving method of the liquid crystal apparatus according to the third exemplary embodiment are different from the liquid crystal apparatus and the driving method of the aforementioned exemplary embodiments in that not only an insulating film for covering a counter electrode but also an insulating film for covering a pixel electrode is included, but the other configuration is approximately similar to the configuration of the aforementioned exemplary embodiments. Herein, differences with respect to the aforementioned exemplary embodiments will be described, and the identical reference numbers are applied to the elements common to the elements of the aforementioned exemplary embodiments, and their descriptions will be omitted.

In the liquid crystal apparatus according to the third exemplary embodiment, in the cross-sectional view illustrated in FIG. 4, an insulating film 17 (not illustrated in FIG. 4) between the pixel electrode 15 and the alignment film 18 of the element substrate 10 is formed. That is, the insulating film 17 and the alignment film 18 are formed in such a manner as to cover the pixel electrode 15.

Figure 22:
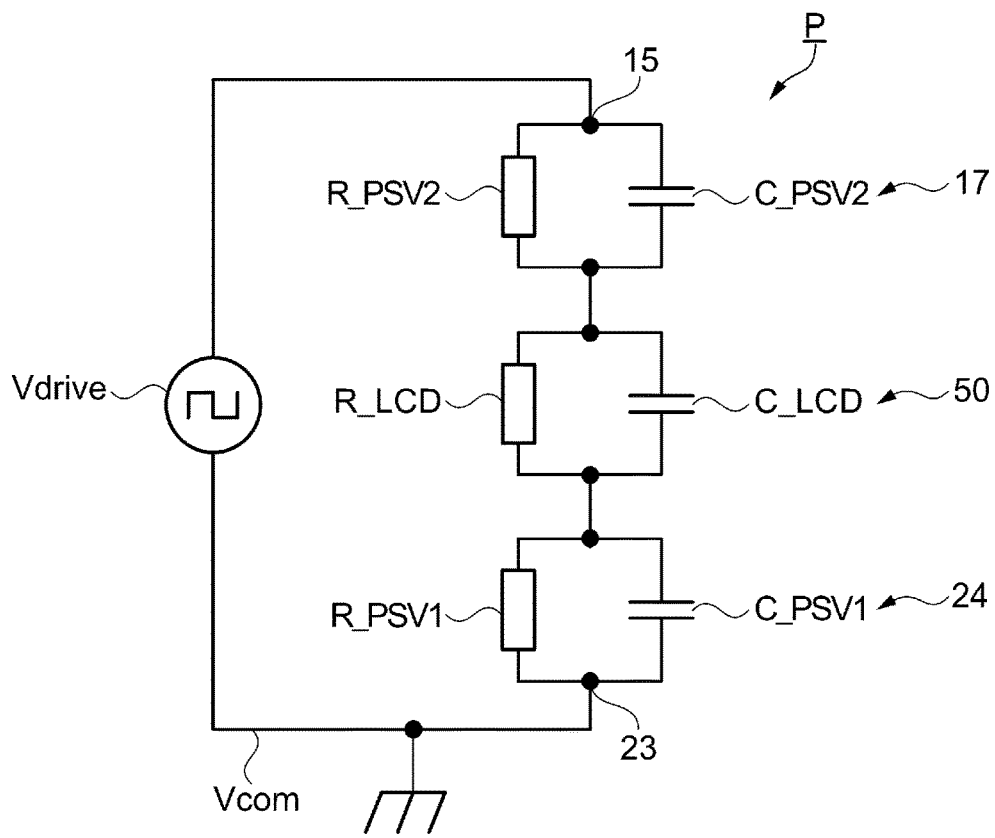
FIG. 22 is an equivalent circuit diagram of a pixel according to a third exemplary embodiment.

FIG. 22 is an equivalent circuit diagram of a pixel according to the third exemplary embodiment. The pixel P according to the third exemplary embodiment is represented as configuration in which the insulating film 17, the liquid crystal layer 50, and the insulating film 24 that are electrically connected in series between the pixel electrode 15 and the counter electrode 23 are included. The insulating film 17 is configured to cover the pixel electrode 15, and the insulating film 24 is configured to cover the counter electrode 23. For example, the counter electrode voltage (Vcom) of 0 V, which is a fixed potential, is applied to the counter electrode 23. The insulating films 17 and 24, for example, are composed of a silicon oxide film, and respective thicknesses, for example, are 100 nm.

As described above, the liquid crystal layer 50 is represented as configuration in which the resistance component R_LCD and the capacitance component C_LCD are electrically connected in parallel. The insulating film 24 that covers the counter electrode 23 is represented as configuration in which a resistance component R_PSV1 and a capacitance component C_PSV1 are connected in parallel. The insulating film 17 that covers the pixel electrode 15 is represented as configuration in which a resistance component R_PSV2 and a capacitance component C_PSV2 are connected in parallel. The equivalent circuit of the dummy pixel DP is similarly represented by the circuit of the pixel P.

In this configuration, as illustrated in FIG. 10, an alternating current voltage whose center potential $VC_1$ is offset to a high potential side with respect to 0 V that is the counter electrode potential (Vcom) is applied to the pixel electrode 15 of the pixel P1 positioned in the first region D1, and an alternating current voltage whose center potential $VC_2$ is offset to a low potential side with respect to 0 V that is the counter electrode potential (Vcom) is applied to the pixel electrode 15 of the pixel P2 positioned in the second region D2.

Figure 23:
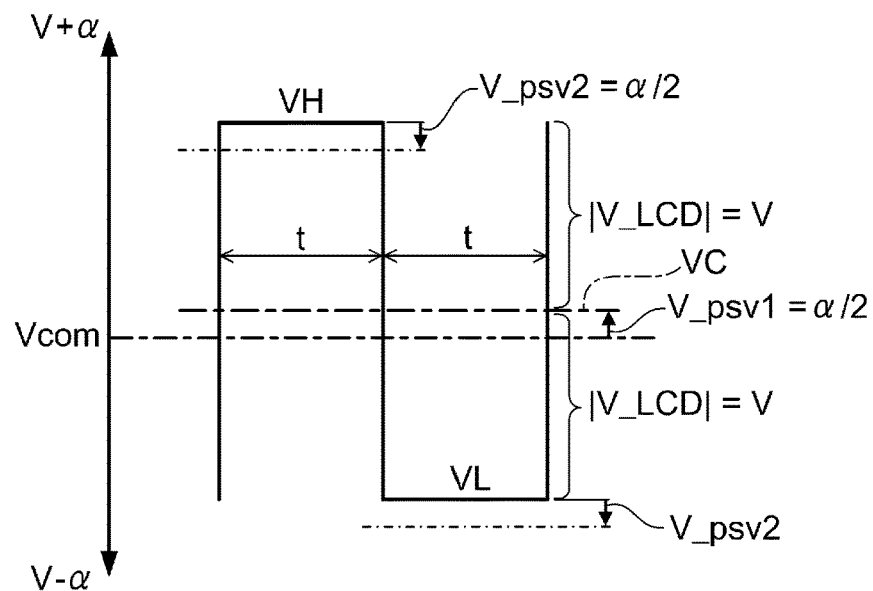
FIG. 23 is a graph illustrating a relation between an alternating current voltage and a surface potential of an insulating film according to the third exemplary embodiment.

FIG. 23 is a graph illustrating a relation between an alternating current voltage and a surface potential of an insulating film according to the third exemplary embodiment. The surface potential V_psv1 of the insulating film 24 and the surface potential V_psv2 of the insulating film 17 in the case that the insulating film 24 is provided on the counter electrode 23 side and the insulating film 17 is provided on the pixel electrode 15 side will be described with reference to FIG. 23.

As illustrated in FIG. 23, for example, it is assumed that the center potential of the alternating current voltage applied to the pixel electrode 15 is offset by +α (mV). As described above, the interface in-between voltage of the insulating film 24 that covers the counter electrode 23 becomes equal to the surface potential V_psv1 of the insulating film 24. It is assumed that an interface in-between voltage of the insulating film 17 that covers the the pixel electrode 15 is V_psv2. When the rectangular wave of the alternating current voltage is of the positive polarity with respect to the counter electrode potential (Vcom), and when a charge amount moving in the direction in which the insulating film 24 is charged is Q_psv1(p), and a charge amount moving in the direction in which the insulating film 17 is charged is Q_psv2(p), during a half period of the alternating current voltage, the surface potential of the insulating film 17 at the time of the positive polarity is given as "V+α−V_psv2", and thus the charge amounts Q_psv1(p) and Q_psv2(p) are given by Mathematical Formula (4) described below.

Mathematical Formula 4

$$Q\_psv1(p)=Q\_psv2(p)=(V+\alpha-V\_psv1-V\_psv2)/R\_LCD \times t \quad (4)$$

As illustrated in FIG. 22, R_LCD is an electric resistance component of the liquid crystal layer 50, and t is a time of the half period (one frame) of the alternating current voltage.

Similarly, when the rectangular wave of the alternating current voltage is of the negative polarity with respect to the counter electrode potential (Vcom), and when a charge amount moving in the direction in which the insulating film 24 is charged is Q_psv1(n), and a charge amount moving in the direction in which the insulating film 17 is charged is Q_psv2(n), the surface potential of the insulating film 17 at the time of the negative polarity is given as "−V+α−V_psv2=−(V−α+V_psv2)", and thus the charge amounts Q_psv1(n) and Q_psv2(n) are given by Mathematical Formula (5) described below.

Mathematical Formula 5

$$Q\_psv1(n)=Q\_psv2(n)=-(V-\alpha+V\_psv1+V\_psv2)/R\_LCD \times t \quad (5)$$

Thus, the charge amount Q_psv moving in the direction in which the respective insulating films are charged in one period of the alternating current voltage is the sum of the charge movement amount of the positive polarity and the charge movement amount of the negative polarity, and thus the charge amount Q_psv is given by Mathematical Formula (6).

Mathematical Formula 6

$$Q\_psv1(p) + Q\_psv1(n) = Q\_psv2 + Q\_psv2(n) \quad (6)$$
$$= (2\alpha - 2V\_psv1 - 2V\_psv\_2)/R\_LCD \times t$$

When a state of equilibrium is reached after a sufficient time elapses, the average value of one period of the alternating current voltage of the interface in-between voltage V_psv1 of the insulating film 24 and the interface in-between voltage V_psv2 of the insulating film 17 converges to a certain constant value and eventually does not change. This is equivalent to a case that the sum of the charge amount moving in the direction in which the insulating films are charged during one period of the alternating current voltage represented by Mathematical Formula (6), that is, "Q_psv1(p)+Q_psv1(n)=Q_psv2(p)+Q_psv2(n)" reaches "0".

Consequently, the right side (2α−2V_psv1−2V_psv2/R_LCD×t) of Mathematical Formula (6) also reaches "0". That is, V_psv1+V_psv2=α is given, and V_psv1=V_psv2 is given because the insulating film 24 and the insulating film 17 are homogeneous and have an identical thickness in the third exemplary embodiment, and thus V_psv1 and V_psv2 that are the interface in-between voltages (surface potentials) of the insulating film 24 and the insulating film 17 in a state of equilibrium reach +α/2 (mV) that is a half value in the case that the insulating film 24 is merely provided on the counter electrode 23 as described in the aforementioned exemplary embodiments.

Similarly, when it is assumed that the center potential of the alternating current voltage applied to the pixel electrode 15 or the dummy pixel electrode 15d is offset by −α (mV), in this case, the interface in-between voltage (surface potential) "V_psv1=V_psv2" of each insulating film in a state of equilibrium reaches −α/2 (mV) that is a half value in the case that the insulating film 24 is merely provided on the counter electrode 23.

The surface potential V_psv1 of the insulating film 24 that covers the counter electrode 23 includes a potential gradient of ±α/2 (mV) with reference to the counter electrode potential (Vcom) in a state of D0 (see FIG. 10). The surface potential V_psv2 of the insulating film 17 that covers the pixel electrode 15 includes a potential gradient of ±α/2 (mV) with reference to D0. Thus, the absolute value |V_LCD|=V of the voltage V_LCD actually applied to the liquid crystal layer 50 becomes constant between the first region D1 and the second region D2.

The potential gradient with reference to D0 in the third exemplary embodiment is ±α/2 (mV), and a value of the potential gradient is halved, compared with the case in which only the counter electrode 23 is covered with the insulating film 24. Consequently, a lateral electric field in the Y direction is reduced in the display region E1, and thus force that causes the ionic impurities to move is abated, but the surface potential of the insulating film 24 on the counter electrode 23 side and the surface potential of the insulating film 17 on the pixel electrode 15 side can be kept in balance.

Note that in the configuration in which the insulating film 17 is provided merely on the pixel electrode 15 side, as described above, the direction of the interface in-between voltage generated by electric charges charged to the insulating film 17 corresponds to a direction from a high potential VH to the counter electrode potential (Vcom) when the alternating current voltage is of the positive polarity, and corresponds to a direction from the counter electrode potential (Vcom) to a minus (−) potential when the alternating current voltage is of the negative polarity, and thus the surface potential V_psv in a state of equilibrium does not include a potential gradient. That is, the invention cannot be achieved with the configuration in which the insulating film 17 is provided merely on the pixel electrode 15 side.

Thereinbefore, the liquid crystal apparatus and the driving method of the liquid crystal apparatus have been described with the exemplary embodiments and the modified examples, but modified examples described below may be further included.

Modified Example 8

In the exemplary embodiments and the modified examples, the configuration has been provided wherein a voltage offset to a high potential side or a low potential side with reference to the counter electrode potential (Vcom) is a (mV) in the first region D1, the second region D2, and the third region D3, but the configuration is not limited to this. The voltage offset to a high potential side or a low potential side with reference to the counter electrode potential (Vcom) may be configured to be set not only to a (mV), but also to voltages having different multiple levels.

Modified Example 9

In the exemplary embodiments and the modified examples, the configuration has been provided wherein the first regions D1 in which the center potential $VC_1$ is offset to a high potential side and the second regions D2 in which the center potential $VC_2$ is offset to a low potential side, with reference to the counter electrode potential (Vcom) applied to the counter electrode 23, are alternately arranged in the plane of the display region E1 in which the plurality of pixel electrodes 15 are arranged, but the configuration is not limited to this. A configuration in which the first regions D1 and the second regions D2 are alternately arranged in the plane of the pixel region E that includes the dummy pixel region E2 in which the plurality of dummy pixel electrodes 15d are arranged and the display region E1 may be provided.

Modified Example 10

The method for applying an alternating current voltage set in such a manner that the first regions D1 in which the center potential $VC_1$ is offset to a high potential side with reference to the counter electrode potential (Vcom) and the second regions D2 in which the center potential $VC_2$ is offset to a low potential side with reference to the counter electrode potential (Vcom) are alternately arranged in the display region E1, to the pixel electrode 15 is not limited to an execution immediately after the displaying is started. For example, until a predetermined time lapses from a start of display, an alternating current voltage may be applied in such a manner that a potential gradient of the offset gradually changes from zero to a predetermined value.

According to this method, the surface potential V_psv of the insulating film 24 that covers the counter electrode 23 gradually changes in accordance with the way the potential gradient is provided, and thus occurrence of a display malfunction, for example, flicker and the like due to a sudden change in the surface potential V_psv can be suppressed. Note that the aforementioned predetermined time, for example, ranges from 2 to 3 minutes.

Fourth Exemplary Embodiment

Electronic Apparatus

Figure 24:
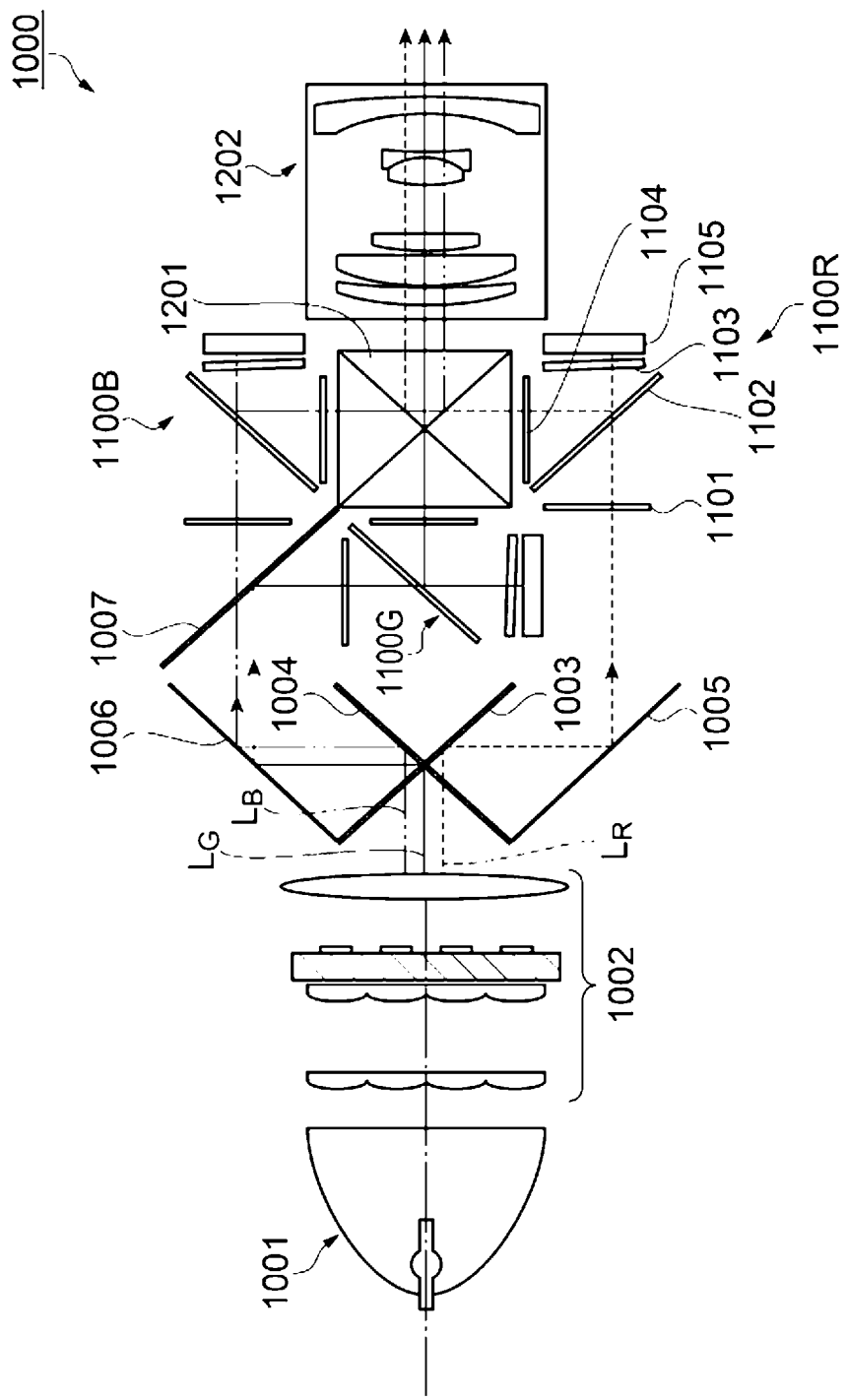
FIG. 24 is a schematic diagram illustrating the schematic configuration of a projector which is one example of an electronic apparatus according to a fourth exemplary embodiment.

Next, one example of an electronic apparatus according to a fourth exemplary embodiment will be described with reference to FIG. 24. FIG. 24 is a schematic diagram illustrating the schematic configuration of a projector which is one example of the electronic apparatus according to the fourth exemplary embodiment. The liquid crystal apparatus 100 of the aforementioned exemplary embodiments is applied to a projector 1000 according to the fourth exemplary embodiment.

The projector 1000 illustrated in FIG. 24 includes a light source 1001, an integrator optical system 1002, dichroic mirrors 1003, 1004, and 1007 as a color separation optical system, reflective mirrors 1005 and 1006, liquid crystal light valves 1100R, 1100G, and 1100B of a three system, a dichroic prism 1201 as a color composition element, and a projection lens group 1202 as a projection optical system.

A source light emitted from the light source 1001 is incident to the integrator optical system 1002. The source light that has been incident to the integrator optical system 1002 is emitted after its luminous intensity is uniformized, and a state of polarization is unified. The source light emitted from the integrator optical system 1002 is split by the dichroic mirrors 1003 and 1004 which are color separation optical system into red light $L_R$, green light $L_G$, and blue light $L_B$. The red light $L_R$ is reflected by the reflective mirror 1005 and is incident to the liquid crystal light valve 1100R. The green light $L_G$ and the blue light $L_B$ are reflected by the reflective mirror 1006 and are incident to the dichroic mirror 1007. The green light $L_G$ is reflected by the dichroic mirror 1007 again and is incident to the liquid crystal light valve 1100G. The blue light $L_B$ transmits the dichroic mirror 1007 and is incident to the liquid crystal light valve 1100B.

The liquid crystal light valve 1100R forms a red image, the liquid crystal light valve 1100G forms a green image, and the liquid crystal light valve 1100B forms a blue image, respectively. That is, color light incident to each of the liquid crystal light valves 1100R, 1100G, and 1100B is modulated based on the display data of an image to be displayed and developed into image light. After the three color image lights emitted from the liquid crystal light valves 1100R, 1100G, and 1100B of the three system are combined by the dichroic prism 1201 being a color composition element, the combined image light is projected to a surface to be projected (not illustrated) such as a screen by the projection lens group 1202. Consequently, a full-color image is displayed on the surface to be projected.

The liquid crystal light valves 1100R, 1100G, and 1100B of the three system include a common configuration. Herein, the liquid crystal light valve 1100R for red image will be described.

The liquid crystal light valve 1100R includes an optical modulation element 1105, an incident side polarizing plate 1101, a polarization splitter 1102, an optical compensator 1103, and an emission side polarizing plate 1104. The incident side polarizing plate 1101, for example, causes the red light of p-polarization to be transmitted to the polarization splitter 1102. The red light transmitted through the polarization splitter 1102 passes the optical compensator 1103, is incident to the reflective-type optical modulation element 1105 and is modulated and emitted as light including a polarization component (s-polarization to the polarization splitter 1102) indicating an image.

The light emitted from the optical modulation element 1105 is incident to the polarization splitter 1102 via the optical compensator 1103. An s-polarization component included in the light modulated by the optical modulation element 1105 is reflected by the polarization splitter 1102 and is incident to the emission side polarizing plate 1104. The s-polarization component incident on the emission side polarizing plate 1104 transmits the emission side polarizing plate 1104 to be incident to the dichroic prism 1201, and is projected after being combined with the image light of another color.

The projector 1000 including the aforementioned configuration, for example, uses the liquid crystal apparatus 100 of the first exemplary embodiment as the optical modulation element 1105 for modulating the source light. Consequently, in the liquid crystal apparatus 100, the ionic impurities can be effectively swept away from the display region E1 to the dummy pixel region E2, and from the dummy pixel region E2 to an outside, and deterioration in display quality is effectively suppressed. Thus, according to the projector 1000 of the aforementioned exemplary embodiment, the high-contrast display can be achieved, and furthermore excellent reliability in terms of display quality can be obtained.

The invention is not limited to the aforementioned exemplary embodiments, but can be appropriately modified and changed within the scope of the gist or concept of the invention that can be read from the claims and the whole of the specification, and a liquid crystal apparatus including the aforementioned modification, the driving method for the liquid crystal apparatus, and the electronic apparatus to which the liquid crystal apparatus is applied are also included in the technical scope of the invention. Various modified examples are conceivable, besides the aforementioned exemplary embodiments. Hereinafter, modified examples will be exemplified and described.

Modified Example 11

The liquid crystal apparatus 100 to which the driving method of the aforementioned exemplary embodiments is applied is not limited to the reflective type, but a transmissive type can be applied. That is, the projector that uses the liquid crystal apparatus 100 as the liquid crystal light valve, to which the driving method of the aforementioned exemplary embodiments is applied, is not limited to the reflective type.

Modified Example 12

That is, the electronic apparatus that uses the liquid crystal apparatus 100 as a display unit, to which the driving method of the aforementioned exemplary embodiments is applied, is not limited to the projector 1000. For example, the liquid crystal apparatus with a configuration in which a color filter is included in the pixel can be favorably used as the display unit for information terminal devices such as projection-type heads-up displays (HUD), direct-view head-mounted displays (HMD), and electronic books, personal computers, digital still cameras, liquid crystal televisions, viewfinder-based or direct-view monitor-based video recorders, car navigation systems, electronic organizers, and POSs.

The entire disclosure of Japanese Patent Application No. 2017-204978, filed Oct. 24, 2017 is expressly incorporated by reference herein.

What is claimed is:

1. A driving method for a liquid crystal apparatus including a data line extending along a first direction, a scanning line extending along a second direction that intersects the first direction, a pixel electrode corresponding to an intersection of the data line and the scanning line, a counter electrode opposing to the pixel electrode, a liquid crystal layer between the pixel electrode and the counter electrode, an alignment film between the counter electrode and the liquid crystal layer, and an insulating film between the counter electrode and the alignment film and in contact with the alignment film, the method comprising:
applying an alternating current voltage to a plurality of pixels, the alternating current voltage being set in a manner that a first region in which a center potential is offset to a high potential side and a second region in which a center potential is offset to a low potential side, with reference to a counter electrode potential applied to the counter electrode, are alternately arranged along the first direction and the second direction in a plane of a display region in which the plurality of pixels are arranged.

2. The driving method for the liquid crystal apparatus according to claim 1, comprising:
applying an alternating current voltage to the plurality of pixels, the alternating current voltage being set in a manner that the first region and the second region are arranged in a checkered pattern.

3. The driving method for the liquid crystal apparatus according to claim 1, comprising:
applying an alternating current voltage to the plurality of pixels, the alternating current voltage being set in a manner that the first region and the second region are arranged in a stripe pattern.

4. The driving method for the liquid crystal apparatus according to claim 3, comprising:
applying an alternating current voltage to the plurality of pixels, the alternating current voltage being set in a manner that an extending direction of the stripe pattern intersects with an alignment direction of the liquid crystal layer.

5. The driving method for the liquid crystal apparatus according to claim 1, comprising:
applying an alternating current voltage to the plurality of pixels, the alternating current voltage being set in a manner that the first region and the second region include a plurality of pixels.

6. The driving method for the liquid crystal apparatus according to claim 1, comprising:
applying an alternating current voltage to the plurality of pixels, the alternating current voltage being set in a manner that the first region and the second region include one pixel.

7. The driving method for the liquid crystal apparatus according to claim 1, comprising:
applying an alternating current voltage to the plurality of pixels, the alternating current voltage being set in a manner that third regions, in which center potentials are offset to the same potential side with respect to the counter electrode potential, are arranged at diagonal positions in the plane of the display region.

8. The driving method for the liquid crystal apparatus according to claim 1, comprising:
applying an alternating current voltage to the plurality of pixels in a manner that an offset amount of the center potential of the alternating current voltage with respect to the counter electrode potential gradually changes from zero to a predetermined value until a predetermined time lapses from a start of display.

9. The driving method for the liquid crystal apparatus according to claim 1, wherein the alignment film includes an inorganic material.

10. A liquid crystal apparatus comprising:
a data line extending along a first direction;
a scanning line extending along a second direction that intersects the first direction;
a pixel electrode corresponding to an intersection of the data line and the scanning line;
a counter electrode opposing to the pixel electrode;
a liquid crystal layer between the pixel electrode and the counter electrode;
an alignment film between the counter electrode and the liquid crystal layer;
an insulating film between the counter electrode and the alignment film and in contact with the alignment film; and
an alternating current voltage generation circuit configured to output an alternating current voltage to a plurality of pixels, the alternating current voltage being set in a manner that a first region in which a center potential is offset to a high potential side and a second region in which a center potential is offset to a low potential side, with reference to a counter electrode potential applied to the counter electrode, are alternately arranged along the first direction and the second direction in a plane of a display region in which the plurality of pixels are arranged.

11. The liquid crystal apparatus according to claim 10, wherein
the alternating current voltage generation circuit is configured to output an alternating current voltage to the plurality of pixels, the alternating current voltage being set in a manner that the first region and the second region are arranged in a checkered pattern.

12. The liquid crystal apparatus according to claim 10, wherein
the alternating current voltage generation circuit is configured to output an alternating current voltage to the plurality of pixels, the alternating current voltage being set in a manner that the first region and the second region are arranged in a stripe pattern.

13. The liquid crystal apparatus according to claim 12, wherein
the alternating current voltage generation circuit is configured to output an alternating current voltage to the plurality of pixels, the alternating current voltage being set in a manner that an extending direction of the stripe pattern intersects with an alignment direction of the liquid crystal layer.

14. The liquid crystal apparatus according to claim 10, wherein
the alternating current voltage generation circuit is configured to output an alternating current voltage to the plurality of pixels, the alternating current voltage being set in a manner that the first region and the second region include a plurality of pixels.

15. The liquid crystal apparatus according to claim 10, wherein
the alternating current voltage generation circuit is configured to output an alternating current voltage to the plurality of pixels, the alternating current voltage being set in a manner that the first region and the second region include one pixel.

16. The liquid crystal apparatus according to claim 10, wherein
the alternating current voltage generation circuit is configured to output an alternating current voltage to the plurality of pixels, the alternating current voltage being set in a manner that a plurality of pixels, with the same offset amount of the center potential with respect to the counter electrode potential, are arranged at diagonal positions in the plane of the display region.

17. The liquid crystal apparatus according to claim 10, wherein the alternating current voltage generation circuit is configured to output an alternating current voltage to the plurality of pixels in a manner that an offset amount of the center potential with respect to the counter electrode potential gradually changes from zero to a predetermined value until a predetermined time lapses from a start of display.

18. An electronic apparatus comprising:

the liquid crystal apparatus according to claim 10.

19. A driving method for a liquid crystal apparatus including a data line extending along a first direction, a scanning line extending along a second direction that intersects the first direction, a pixel electrode corresponding to an intersection of the data line and the scanning line, a counter electrode opposing to the pixel electrode, a liquid crystal layer between the pixel electrode and the counter electrode, an alignment film between the counter electrode and the liquid crystal layer and aligns liquid crystal molecules of the liquid crystal layer along an alignment direction that intersects the first direction and the second direction, and an insulating film between the counter electrode and the alignment film and in contact with the alignment film, the method comprising:

applying an alternating current voltage to a plurality of pixels, the alternating current voltage being set in a manner that a first region in which a center potential is offset to a high potential side and a second region in which a center potential is offset to a low potential side, with reference to a counter electrode potential applied to the counter electrode, are alternately arranged along the alignment direction or a direction orthogonal to the alignment direction in a plane of a display region in which the plurality of pixels are arranged.

* * * * *